(12) United States Patent
Tsutsumi et al.

(10) Patent No.: US 11,698,336 B2
(45) Date of Patent: Jul. 11, 2023

(54) ANALYSIS METHOD AND ANALYSIS APPARATUS

(71) Applicants: JEOL Ltd., Tokyo (JP); National Institute of Advanced Industrial Science and Technology, Tokyo (JP)

(72) Inventors: Kenichi Tsutsumi, Tokyo (JP); Akihiro Tanaka, Tokyo (JP); Kazushiro Yokouchi, Tokyo (JP); Tatsuya Uchida, Tokyo (JP); Noboru Taguchi, Osaka (JP); Shingo Tanaka, Osaka (JP)

(73) Assignees: JEOL Ltd., Tokyo (JP); National Institute of Advanced Industrial Science and Technology, Tokyo (JP)

( * ) Notice: Subject to any disclaimer, the term of this patent is extended or adjusted under 35 U.S.C. 154(b) by 93 days.

(21) Appl. No.: 17/036,825

(22) Filed: Sep. 29, 2020

(65) Prior Publication Data
US 2021/0096063 A1    Apr. 1, 2021

(30) Foreign Application Priority Data

Sep. 30, 2019   (JP) .................................. 2019-180330
May 13, 2020    (JP) .................................. 2020-084313

(51) Int. Cl.
*G01N 21/17*    (2006.01)
*G01N 21/25*    (2006.01)

(52) U.S. Cl.
CPC ..... *G01N 21/25* (2013.01); *G01N 2021/1765* (2013.01); *G01N 2201/10* (2013.01); *G01N 2201/127* (2013.01)

(58) Field of Classification Search
CPC ..................... H01J 37/222; H01J 37/28; H01J 2237/24585; H01J 2237/2802;
(Continued)

(56) References Cited

U.S. PATENT DOCUMENTS

| 6,448,555 B1 * | 9/2002 | Hosokawa | ............ H01J 37/256 250/311 |
| 2009/0045335 A1 * | 2/2009 | Obara | ..................... H01J 37/28 250/306 |

(Continued)

FOREIGN PATENT DOCUMENTS

| JP | 2000106121 A | * | 4/2000 | ............ H01J 37/256 |
| JP | 2000106121 A |   | 4/2000 | |

(Continued)

OTHER PUBLICATIONS

Office Action issued in JP2020-084313 dated Sep. 28, 2021.

*Primary Examiner* — Isiaka O Akanbi
(74) *Attorney, Agent, or Firm* — The Webb Law Finn

(57) ABSTRACT

An analysis method includes: obtaining n×m pieces of map data by repeating, m times, a map measurement in which n pieces of map data are obtained by scanning a specimen with a primary probe to detect electrons emitted from the specimen with an electron spectrometer, while measurement energy ranges of an analyzer are varied; and generating a spectral map in which a position on the specimen is associated with a spectrum based on the n×m pieces of map data, the measurement energy ranges of m times of the map measurement not overlapping each other.

19 Claims, 23 Drawing Sheets

(58) Field of Classification Search
CPC ........ H01J 2237/2442; H01J 2237/221; G01N 21/25; G01N 2021/1765; G01N 2201/10; G01N 2201/127
USPC ......................................................... 356/300
See application file for complete search history.

(56) References Cited

U.S. PATENT DOCUMENTS

| | | | |
|---|---|---|---|
| 2011/0155906 A1* | 6/2011 | Terada | H01J 37/20 250/311 |
| 2011/0240854 A1* | 10/2011 | Terada | H01J 37/05 250/311 |
| 2016/0111247 A1* | 4/2016 | Potocek | H01J 37/28 250/307 |
| 2016/0111248 A1* | 4/2016 | Morita | H01J 37/222 250/306 |
| 2018/0033589 A1* | 2/2018 | Schamber | H01J 37/20 |
| 2019/0072504 A1* | 3/2019 | Kato | G01N 23/223 |
| 2020/0111197 A1* | 4/2020 | Uchida | G06T 5/009 |

FOREIGN PATENT DOCUMENTS

| | | | |
|---|---|---|---|
| JP | 2000294185 A | | 10/2000 |
| JP | 2001312994 A | | 11/2001 |
| JP | 2017204425 A | * | 11/2017 |
| JP | 2017204425 A | | 11/2017 |

\* cited by examiner

| Energy[eV] | Channel | Intensity a.u. |
|---|---|---|
| 20.00 | −3 | 1000 |
| 20.12 | −2 | 883 |
| 20.25 | −1 | 752 |
| 20.37 | 0 | 710 |
| 20.50 | +1 | 681 |
| 20.62 | +2 | 687 |
| 20.75 | +3 | 609 |
| 20.88 | −3 | 972 |
| 21.01 | −2 | 867 |
| 21.14 | −1 | 737 |
| 21.27 | 0 | 698 |
| 21.40 | +1 | 667 |
| 21.53 | +2 | 677 |
| 21.66 | +3 | 604 |
| ⋮ | ⋮ | ⋮ |
| 997.33 | −3 | 283 |
| 1003.47 | −2 | 290 |
| 1009.65 | −1 | 267 |
| 1015.87 | 0 | 253 |
| 1022.12 | +1 | 258 |
| 1028.41 | +2 | 263 |
| 1034.74 | +3 | 230 |

FIG. 7

ANALYSIS METHOD AND ANALYSIS APPARATUS

CROSS-REFERENCE TO RELATED APPLICATIONS

This application claims priority to Japanese Patent Application No. 2019-180330 filed Sep. 30, 2019 and Japanese Patent Application No. 2020-084313 filed May 13, 2020, the disclosures of which are hereby incorporated by reference in their entirety.

BACKGROUND OF THE INVENTION

Field of the Invention

The present invention relates to an analysis method and an analysis apparatus.

Description of Related Art

In an analysis apparatus such as an X-ray photoelectron spectroscope or an Auger electron microscope, by analyzing the energy of an electron with an electron spectrometer, it is possible to detect only an electron having specific energy. The selection of energy to be measured is performed by controlling an electron lens provided in the electron spectrometer. For example, by repeating a measurement while sweeping the energy to be measured, an energy spectrum is obtained (see, e.g., JP-A-2001-312994). In addition, by fixing the measurement energy and scanning an incident probe over a specimen surface, an electron-spectroscopic image is obtained. The electron-spectroscopic image is an image showing the distribution of electrons having specific energy.

By sweeping the measurement energy and combining scanning with a primary probe, it is possible to obtain the energy spectrum at each measurement point on the specimen surface. A map in which a position on the specimen is associated with the spectrum in the above manner is referred to as a spectral map.

The spectral map can be generated by performing point analysis at each measurement point in an analysis field to obtain the energy spectrum. However, a problem arises in that it takes time to obtain the spectral map.

For example, in the point analysis for obtaining the energy spectrum in the Auger electron microscope, it is necessary to repeatedly execute control of the electron lens of the electron spectrometer and analysis and detection of electrons. During the control of the electron lens, a waiting time period for stabilization after changing electrode voltage or coil current in the electron spectrometer is required. Depending on analysis conditions of the electron spectrometer, there are cases where the waiting time period ranges from several minutes to several tens of minutes.

As described above, in the case where the spectral map is obtained by performing the point analysis at each measurement point in the analysis field, the above waiting time period is required at each measurement point. Consequently, it takes time to obtain the spectral map.

SUMMARY OF THE INVENTION

According to a first aspect of the invention, there is provided an analysis method which uses an analysis apparatus, the analysis apparatus including an electron spectrometer which includes: an analyzer which analyzes energy of electrons emitted from a specimen by irradiating the specimen with a primary probe; and a detector which includes n detection sections arranged in an energy dispersion direction of the electrons of which the energy has been analyzed by the analyzer, the analysis method including:

obtaining n×m pieces of map data by repeating, m times, a map measurement in which n pieces of map data are obtained by scanning the specimen with the primary probe to detect the electrons emitted from the specimen with the electron spectrometer, while measurement energy ranges of the analyzer are varied; and generating a spectral map in which a position on the specimen is associated with a spectrum based on the n×m pieces of map data, the measurement energy ranges of m times of the map measurement not overlapping each other.

According to a second aspect of the invention, there is provided an analysis method which uses an analysis apparatus, the analysis apparatus including an electron spectrometer which includes: an analyzer which analyses energy of electrons emitted from a specimen by irradiating the specimen with a primary probe; and a detector which includes n detection sections arranged in an energy dispersion direction of the electrons of which the energy has been analyzed by the analyzer, the analysis method including:

obtaining n×m pieces of map data by repeating, m times, a map measurement in which n pieces of map data are obtained by scanning the specimen with the primary probe to detect the electrons emitted from the specimen with the electron spectrometer, while measurement energy ranges of the analyzer are varied; and generating a spectral map in which a position on the specimen is associated with a spectrum based on the n×m pieces of map data, measurement energies of the detection sections not overlapping each other in m times of the map measurement.

According to a third aspect of the invention, there is provided an analysis apparatus including:

an electron spectrometer including an analyzer which analyzes energy of electrons emitted from a specimen by irradiating the specimen with a primary probe, and a detector which includes n detection sections arranged in an energy dispersion direction of the electrons of which the energy has been analyzed by the analyzer; and a processing section which generates a spectral map in which a position on the specimen is associated with a spectrum based on a detection result of the electrons in the electron spectrometer, the processing section performing:

processing of obtaining n×m pieces of map data by repeating, m times, a map measurement in which n pieces of map data are obtained by scanning the specimen with the primary probe to detect the electrons emitted from the specimen with the electron spectrometer, while varying measurement energy ranges of the analyzer are varied; and processing of generating the spectral map in which the position on the specimen is associated with the spectrum based on the n×m pieces of map data, and the measurement energy ranges of m times of the map measurement not overlapping each other.

According to a fourth aspect of the invention, there is provided an analysis apparatus including:

an electron spectrometer including an analyzer which analyzes energy of electrons emitted from a specimen by irradiating the specimen with a primary probe, and a detector which includes n detection sections arranged in an energy dispersion direction of the electrons of which the energy has been analyzed by the analyzer; and a processing section which generates a spectral map in which a position on the specimen is associated with a spectrum based on a detection result of the electrons in the electron spectrometer, the processing section performing:

processing of obtaining n×m pieces of map data by repeating, m times, a map measurement in which n pieces of map data are obtained by scanning the specimen with the primary probe to detect the electrons emitted from the specimen with the electron spectrometer, while measurement energy ranges of the analyzer are varied; and processing of generating the spectral map in which the position on the specimen is associated with the spectrum based on the n×m pieces of map data, and measurement energies of the detection sections not overlapping each other in m times of the map measurement.

BRIEF DESCRIPTION OF THE DRAWINGS

FIG. 7 is a table illustrating a relationship between a channel used in each measurement energy and an intensity in a spectrum S2.

Figure 1:
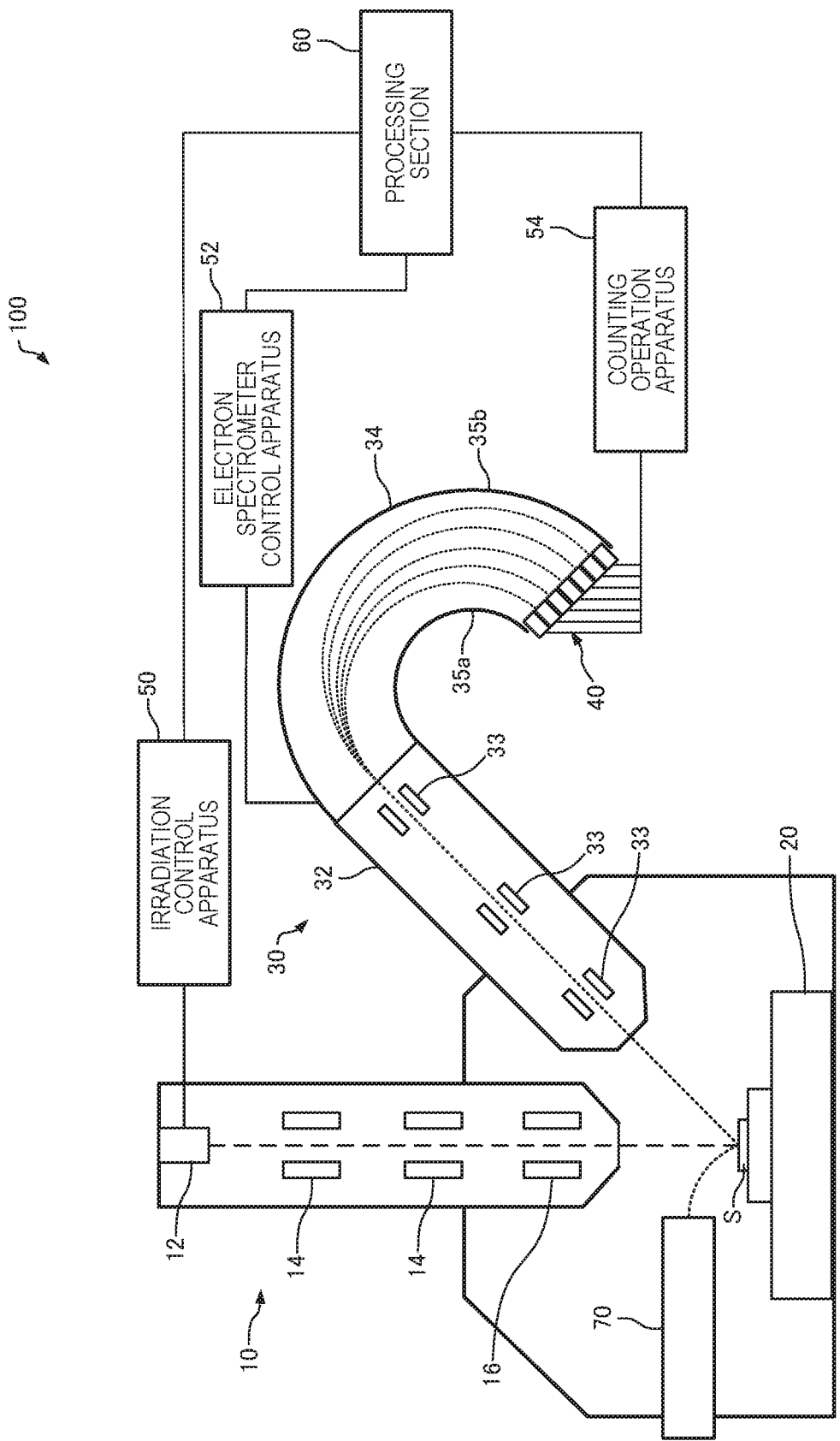
FIG. 1 is a diagram illustrating a configuration of an Auger electron microscope.

DESCRIPTION OF THE INVENTION (1) According to an embodiment of the invention, there is provided an analysis method which uses an analysis apparatus, the analysis apparatus including an electron spectrometer which includes: an analyzer which analyzes energy of electrons emitted from a specimen by irradiating the specimen with a primary probe; and a detector which includes n detection sections arranged in an energy dispersion direction of the electrons of which the energy has been analyzed by the analyzer, the analysis method including:

obtaining n×m pieces of map data by repeating, m times, a map measurement in which n pieces of map data are obtained by scanning the specimen with the primary probe to detect the electrons emitted from the specimen with the electron spectrometer, while measurement energy ranges of the analyzer are varied; and generating a spectral map in which a position on the specimen is associated with a spectrum based on the n×m pieces of map data, the measurement energy ranges of m times of the map measurement not overlapping each other.

In the analysis method described above, a waiting time period for stabilization after changing electrode voltage or coil current in the electron spectrometer is not required at each measurement point, and hence it is possible to perform measurement for obtaining the spectral map in a short period of time.

(2) According to an embodiment of the invention, there is provided an analysis method which uses an analysis apparatus, the analysis apparatus including an electron spectrometer which includes: an analyzer which analyses energy of electrons emitted from a specimen by irradiating the specimen with a primary probe; and a detector which includes n detection sections arranged in an energy dispersion direction of the electrons of which the energy has been analyzed by the analyzer, the analysis method including:

obtaining n×m pieces of map data by repeating, m times, a map measurement in which n pieces of map data are obtained by scanning the specimen with the primary probe to detect the electrons emitted from the specimen with the electron spectrometer, while measurement energy ranges of the analyzer are varied; and generating a spectral map in which a position on the specimen is associated with a spectrum based on the n×m pieces of map data, measurement energies of the detection sections not overlapping each other in m times of the map measurement.

In the analysis method described above, the waiting time period for stabilization after changing the electrode voltage or the coil current in the electron spectrometer is not required at each measurement point, and hence it is possible to perform the measurement for obtaining the spectral map in a short period of time.

(3) According to an embodiment of the invention, there is provided an analysis apparatus including:

an electron spectrometer including an analyzer which analyzes energy of electrons emitted from a specimen by irradiating the specimen with a primary probe, and a detector which includes n detection sections arranged in an energy dispersion direction of the electrons of which the energy has been analyzed by the analyzer; and a processing section which generates a spectral map in which a position on the specimen is associated with a spectrum based on a detection result of the electrons in the electron spectrometer, the processing section performing:

processing of obtaining n×m pieces of map data by repeating, m times, a map measurement in which n pieces of map data are obtained by scanning the specimen with the primary probe to detect the electrons emitted from the specimen with the electron spectrometer, while measurement energy ranges of the analyzer are varied; and processing of generating the spectral map in which the position on the specimen is associated with the spectrum based on the n×m pieces of map data, and the measurement energy ranges of m times of the map measurement not overlapping each other.

In the case of the analysis apparatus described above, the waiting time period for stabilization after changing the electrode voltage or the coil current in the electron spectrometer is not required at each measurement point, and hence it is possible to perform the measurement for obtaining the spectral map in a short period of time.

(4) According to an embodiment of the invention, there is provided an analysis apparatus including:

an electron spectrometer including an analyzer which analyzes energy of electrons emitted from a specimen by irradiating the specimen with a primary probe, and a detector which includes n detection sections arranged in an energy dispersion direction of the electrons of which the energy has been analyzed by the analyzer; and a processing section which generates a spectral map in which a position on the specimen is associated with a spectrum based on a detection result of the electrons in the electron spectrometer, the processing section performing:

processing of obtaining n×m pieces of map data by repeating, m times, a map measurement in which n pieces of map data are obtained by scanning the specimen with the primary probe to detect the electrons emitted from the specimen with the electron spectrometer, while measurement energy ranges of the analyzer are varied; and processing of generating the spectral map in which the position on the specimen is associated with the spectrum based on the n×m pieces of map data, and measurement energies of the detection sections not overlapping each other in m times of the map measurement.

In the case of the analysis apparatus described above, the waiting time period for stabilization after changing the electrode voltage or the coil current in the electron spectrometer is not required at each measurement point, and hence it is possible to perform the measurement for obtaining the spectral map in a short period of time.

Hereinbelow, preferred embodiments of the invention will be described in detail with reference to the drawings. It is noted that the following embodiments do not unduly limit the scope of the invention as stated in the claims. In addition, all of the elements described below are not necessarily essential requirements of the invention.

Further, in the following description, while a description will be made by taking an Auger electron microscope as an example of an analysis apparatus according to each embodiment of the invention, the analysis apparatus according to the embodiment of the invention is not limited thereto.

1. First Embodiment 1.1. Auger Electron Microscope

First, an Auger electron microscope used in an analysis method according to a first embodiment will be described with reference to the drawings. FIG. 1 is a diagram schematically showing an Auger electron microscope 100.

The Auger electron microscope 100 is an apparatus for performing analysis of a specimen by Auger electron spectroscopy. In the Auger electron microscope 100, an electron emitted from a specimen S by irradiating the specimen S with a primary probe such as an electron beam is analyzed and detected by an electron spectrometer 30, and elemental analysis is thereby performed.

As illustrated in FIG. 1, the Auger electron microscope 100 includes an electron beam irradiation apparatus 10, a specimen stage 20, the electron spectrometer 30, an irradiation control apparatus 50, an electron spectrometer control apparatus 52, a counting operation apparatus 54, a processing section 60, and a secondary electron detector 70.

The electron beam irradiation apparatus 10 irradiates the specimen S with the electron beam. The electron beam irradiation apparatus 10 includes an electron gun 12, electron lenses 14, and a deflector 16.

The electron gun 12 emits the electron beam. The electron lens 14 focuses the electron beam emitted from the electron gun 12. The deflector 16 deflects the electron beam focused by the electron lens 14. The specimen S can be scanned with the electron beam by the deflector 16.

The specimen stage 20 can hold and move the specimen S.

The electron spectrometer 30 has an input lens 32, an analyzer 34, and a detector 40. In the electron spectrometer 30, the energy of an electron emitted from the specimen S is analyzed by the analyzer 34, and the analyzed electron is detected by the detector 40.

The input lens 32 guides the electron emitted from the specimen S to the analyzer 34. In addition, the input lens 32 makes an energy resolution variable by decelerating the electron. In the input lens 32, as the electron is decelerated, the resolution is improved but sensitivity is reduced. The input lens 32 is constituted by, e.g., a plurality of electrostatic lenses 33.

The analyzer 34 analyzes the energy of the electron emitted from the specimen S by irradiating the specimen S with the electron beam. The analyzer 34 is, e.g., an electrostatic hemispherical analyzer. The analyzer 34 has an inner hemispherical electrode 35a and an outer hemispherical electrode 35b. In the analyzer 34, by applying voltage between the inner hemispherical electrode 35a and the outer hemispherical electrode 35b, it is possible to extract electrons in an energy range corresponding to the applied voltage.

Note that the configuration of the analyzer 34 is not limited as long as the analyzer 34 can analyze the energy of the electron emitted from the specimen S. As the analyzer 34, a cylindrical mirror analyzer or the like may also be used.

The detector 40 detects the electron of which the energy is analyzed by the analyzer 34.

Figure 2:
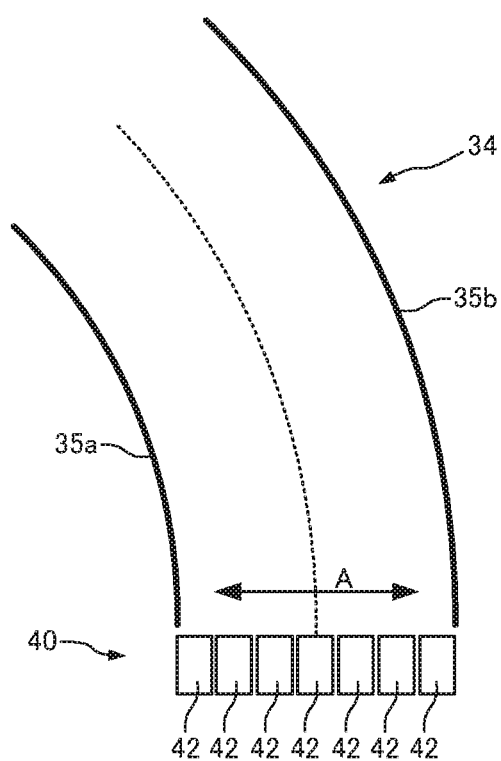
FIG. 2 is a diagram schematically illustrating a detector.

FIG. 2 is a diagram schematically illustrating the detector 40. The detector 40 has n channeltrons 42 (an example of a detection section). The number of channeltrons 42 $n$ is not less than 2 ($n \geq 2$). In an example illustrated in FIG. 2, the detector 40 has seven channeltrons 42 (n=7). The channeltron 42 is a detector which detects electrons and outputs an amplified signal.

The n channeltrons 42 are disposed to be arranged in an energy dispersion direction A on an exit surface (energy dispersion surface) of the analyzer 34. Consequently, the n channeltrons 42 can detect electrons having energies which are different from each other. Accordingly, the detector 40 can detect electrons having different energies at the same time. The n channeltrons 42 are disposed along a direction toward the outer hemispherical electrode 35b from the inner hemispherical electrode 35a.

Figure 3:
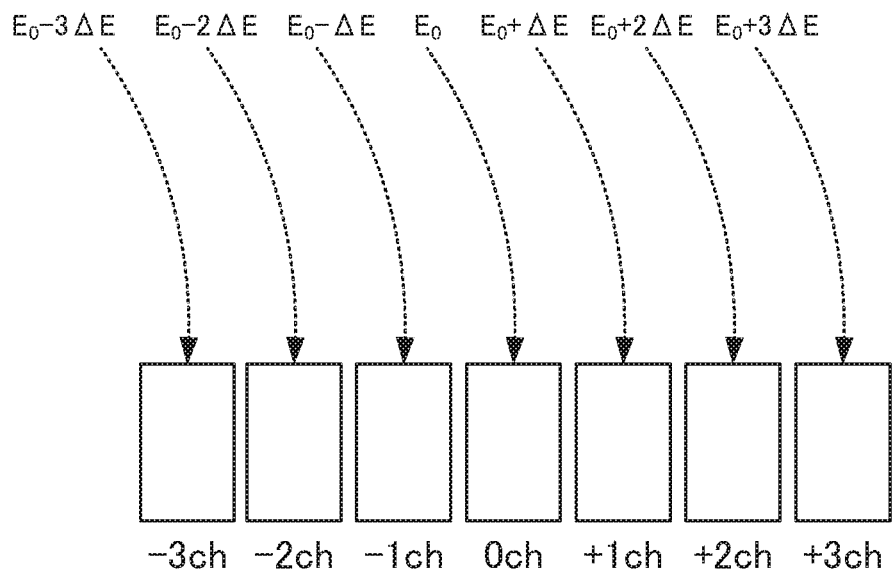
FIG. 3 is a diagram for explaining the function of a detector.

FIG. 3 is a diagram for explaining the function of the detector 40.

As illustrated in FIG. 3, channel numbers of −3ch to +3ch are allocated to seven channeltrons 42. Specifically, 0ch is allocated to the channeltron 42 which detects electrons passing through the center between the electrodes 35a and 35b of the analyzer 34. In addition, from the channeltron 42 having 0ch to the side of the inner hemispherical electrode 35a, the channeltron 42 having −1ch, the channeltron 42 having −2ch, and the channeltron 42 having −3ch are disposed in this order. Further, from the channeltron 42 having 0ch to the side of the outer hemispherical electrode 35b, the channeltron 42 having +1ch, the channeltron 42 having +2ch, and the channeltron 42 having +3ch are disposed in this order.

Seven channeltrons 42 are disposed such that measurement energy intervals $\Delta E$ between adjacent channeltrons 42 are equal to each other. Consequently, for example, in the case where a measurement energy in the channeltron 42 having 0ch is set to $E_0$, the measurement energy in the channeltron 42 having −3ch is $E_0 - 3\Delta E$, the measurement energy in the channeltron 42 having −2ch is $E_0 - 2\Delta E$, the measurement energy in the channeltron 42 having −1 ch is $E_0 - 1\Delta E$, the measurement energy in the channeltron 42 having +1ch is $E_0 + 1\Delta E$, the measurement energy in the channeltron 42 having +2ch is $E_0 + 2\Delta E$, and the measurement energy in the channeltron 42 having +3ch is $E_0 + 3\Delta E$.

Note that, in the above description, while the description has been given of the case where the detector 40 is constituted by n channeltrons 42, the configuration of the detector 40 is not limited thereto. For example, as the detector 40, a multi-channel detector such as a microchannel plate, a multi-anode, or a CMOS camera may also be used.

The irradiation control apparatus 50 controls the electron beam irradiation apparatus 10. The irradiation control apparatus 50 controls the electron beam irradiation apparatus 10 such that the electron beam is applied to a predetermined position on the specimen S based on, e.g., a control signal from the processing section 60.

The electron spectrometer control apparatus 52 controls the electron spectrometer 30. The electron spectrometer control apparatus 52 applies voltage between the inner hemispherical electrode 35a and the outer hemispherical electrode 35b of the analyzer 34 based on, e.g., the control signal from the processing section 60. In addition, the electron spectrometer control apparatus 52 controls the input lens 32 based on the control signal from the processing section 60.

The counting operation apparatus 54 counts electrons detected by the channeltrons 42. The counting operation apparatus 54 sends the result of counting of electrons detected by the channeltrons 42 (i.e., a detection result) to the processing section 60. The number of electrons counted in a unit of time corresponds to the intensity of the electron.

The processing section 60 performs processing such as processing of generating the control signals for controlling the irradiation control apparatus 50 and the electron spectrometer control apparatus 52. In addition, the processing section 60 performs processing of obtaining the detection result of the electrons in the detector 40 and generating a spectral map based on the detection result. Note that the detail of the processing of the processing section 60 will be described later.

The processing section 60 includes, e.g., a central processing unit (CPU), and storage apparatuses (a random access memory (RAM) and a read only memory (ROM)). The processing section 60 performs various calculation processing and various control processing by executing programs stored in the storage apparatuses with the CPU.

The secondary electron detector 70 detects secondary electrons emitted from the specimen S by irradiating the specimen S with the electron beam. The detection result of the secondary electrons in the secondary electron detector 70 is sent to the processing section 60. It is possible to generate a secondary electron image from the detection result of the secondary electrons. The Auger electron microscope 100 has the detector 40 which detects the electron analyzed by the analyzer 34 and the secondary electron detector 70, and hence the Auger electron microscope 100 can obtain an electron-spectroscopic image and the secondary electron image at the same time. Note that, although not illustrated in the drawing, the Auger electron microscope 100 may have a backscattered electron detector.

In the Auger electron microscope 100, the electron beam emitted from the electron gun 12 is focused by the electron lens 14 and is applied to the specimen S. At this point, it is possible to perform a map measurement by scanning the electron beam over the surface of the specimen S by using the deflector 16. Auger electrons, secondary electrons, and backscattered electrons are emitted from the specimen S irradiated with the electron beam.

Electrons, such as Auger electrons, emitted from the specimen S enter the input lens 32, are decelerated by the electrostatic lens 33, and enter the analyzer 34. The energies of the electrons having entered the analyzer 34 are analyzed, and the electrons are dispersed in the energy dispersion direction A on the exit surface of the analyzer 34 according to the energies.

The electrons dispersed according to the energies are detected by n channeltrons 42 disposed to be arranged in the energy dispersion direction A. The electrons detected by the individual channeltrons 42 are counted by the counting operation apparatus 54 for each channeltron 42, and the counting result is sent to the processing section 60.

1.2. Analysis Method

Figure 4:
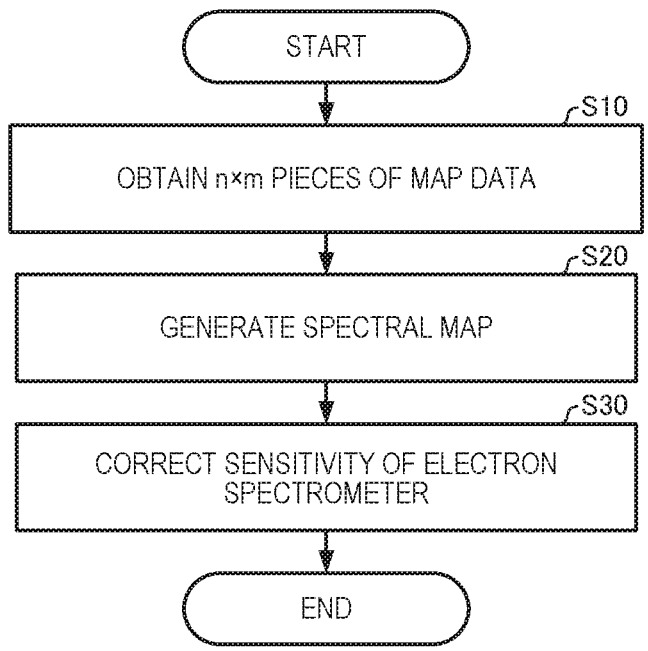
FIG. 4 is a flowchart illustrating an example of an analysis method according to the first embodiment.

Next, a description will be given of the analysis method according to the first embodiment. In the analysis method according to the first embodiment, it is possible to obtain the spectral map by using the Auger electron microscope 100. The spectral map is the map in which a position on the specimen S is associated with a spectrum. FIG. 4 is a flowchart illustrating an example of the analysis method according to the first embodiment.

The analysis method according to the first embodiment includes the step S10 of obtaining n×m pieces of map data by repeating, m times, a map measurement in which n pieces of map data are obtained by scanning the specimen S with the electron beam to detect the electron emitted from the specimen S with the electron spectrometer 30 in varying measurement energy ranges of the analyzer 34, and the step S20 of generating the spectral map based on the obtained n×m pieces of map data. Further, the analysis method according to the first embodiment includes the step S30 of correcting the sensitivity of the electron spectrometer 30. Hereinbelow, each step will be described in detail.

1.2.1. Obtainment of Map Data

First, n×m pieces of map data are obtained by repeating, m times, the map measurement in which n pieces of map data are obtained by scanning the specimen S with the electron beam to detect the electron emitted from the specimen S with the electron spectrometer 30, in varying measurement energy ranges of the analyzer 34.

Figure 5:
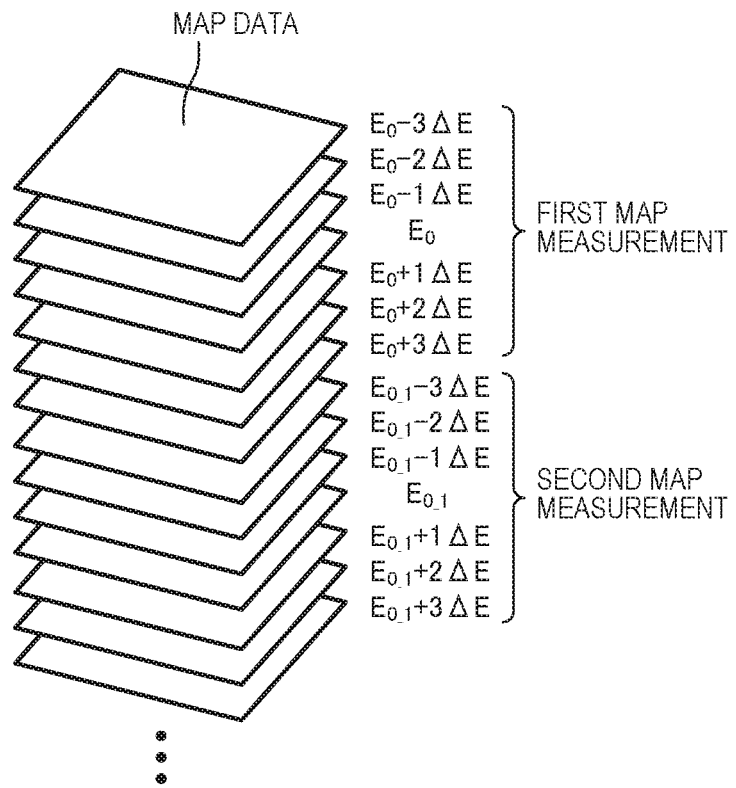
FIG. 5 is a diagram for explaining a step of obtaining n×m pieces of map data.

FIG. 5 is a diagram for explaining the step of obtaining n×m pieces of map data.

First, the measurement energy range of the analyzer 34 is set. The measurement energy range is an energy range in which energy is analyzed by the analyzer 34. The measurement energy range is a range from the measurement energy of the channeltron 42 having −3ch to the measurement energy of the channeltron 42 having +3ch. Herein, the map measurement is performed sequentially from the energy range on a low energy side. The energy ranges of the map measurement which is performed m times are set so as not to overlap each other.

For example, as illustrated in FIG. 3, the measurement energy of the channeltron 42 having 0ch is set to $E_0$, and the measurement energy range is set to $E_0-3\Delta E$ to $E_0+3\Delta E$. With this, the measurement energies of the channeltrons 42 having −3ch to +3ch are set such that the measurement energy intervals $\Delta E$ between the channeltrons 42 are equal to each other.

The measurement energies set in the first map measurement are as follows.

first measurement: −3ch=$E_0-3\Delta E$
first measurement: −2ch=$E_0-2\Delta E$
first measurement: −1ch=$E_0-1\Delta E$
first measurement: 0ch=$E_0$
first measurement: +1ch=$E_0+1\Delta E$
first measurement: +2ch=$E_0+2\Delta E$
first measurement: +3ch=$E_0+3\Delta E$ The first map measurement is performed in a state in which the measurement energies are set as described above. The map measurement is performed by, e.g., scanning the specimen S with the electron beam once, and analyzing and detecting the electron emitted from the specimen S with the electron spectrometer 30. Note that the specimen S may be scanned with the electron beam a plurality of times in one map measurement. With this, it is possible to integrate the intensities of signals at each measurement point.

The detector 40 has seven channeltrons 42, and hence it is possible to obtain seven pieces of map data in one map measurement. In the first map measurement, it is possible to obtain map data of an electron having an energy of $E_0-3\Delta E$, map data of an electron having an energy of $E_0-2\Delta E$, map data of an electron having an energy of $E_0-1\Delta E$, map data of an electron having an energy of $E_0$, map data of an electron having an energy of $E_0+1\Delta E$, map data of an electron having an energy of $E_0+2\Delta E$, and map data of an electron having an energy of $E_0+3\Delta E$.

Note that the map data of an electron having an energy of $E_0$ denotes data in which the position on the specimen is associated with the intensity of the electron having an energy of $E_0$. The map data of an electron having an energy of $E_0$ includes an electron-spectroscopic image showing the distribution of the electron having an energy of $E_0$. The electron-spectroscopic image is obtained by visualizing a difference in the intensity of the electron at individual positions on the specimen. The same applies to the map data of electrons having the other energies.

Next, the measurement energy of the channeltron 42 having 0ch is set to $E_{0\_1}$, and the measurement energy range is set to $E_{0\_1}-3\Delta E$ to $E_{0\_1}+3\Delta E$. The measurement energy ranges of the first map measurement and the second map measurement are set so as not to overlap each other. That is, the minimum value of the measurement energy in the second map measurement is set to be greater than the maximum value of the measurement energy in the first map measurement.

The measurement energies set in the second map measurement are as follows.

second measurement: −3ch=$E_{0\_1}-3\Delta E$
second measurement: −2ch=$E_{0\_1}-2\Delta E$
second measurement: −1ch=$E_{0\_1}-1\Delta E$
second measurement: 0ch=$E_{0\_1}$
second measurement: +1ch=$E_{0\_1}+1\Delta E$
second measurement: +2ch=$E_{0\_1}+2\Delta E$
second measurement: +3ch=$E_{0\_1}+3\Delta E$ Herein, suppose that $\Delta E$ denotes a difference between the measurement energy of the channeltron 42 having +3ch in the first map measurement and the measurement energy of the channeltron 42 having −3ch in the second map measurement. That is, suppose that the measurement energy range of the second map measurement is obtained by shifting the measurement energy range of the first map measurement by n×$\Delta E$. With this, the measurement energies in the second map measurement are expressed as shown below.

second measurement: −3ch=$E_{0\_1}-3\Delta E=E_0+4\Delta E$
second measurement: −2ch=$E_{0\_1}-2\Delta E=E_0+5\Delta E$
second measurement: −1ch=$E_{0\_1}-1\Delta E=E_0+6\Delta E$
second measurement: 0ch=$E_{0\_1}=E_0+7\Delta E$
second measurement: +1ch=$E_{0\_1}+1\Delta E=E_0+8\Delta E$
second measurement: +2ch=$E_{0\_1}+2\Delta E=E_0+9\Delta E$
second measurement: +3ch=$E_{0\_1}+3\Delta E=E_0+10\Delta E$ In the second map measurement, it is possible to obtain map data of an electron having an energy of $E_0+4\Delta E$, map data of an electron having an energy of $E_0+5\Delta E$, map data of an electron having an energy of $E_0+6\Delta E$, map data of an electron having an energy of $E_0+7\Delta E$, map data of an electron having an energy of $E_0+8\Delta E$, map data of an electron having an energy of $E_0+9\Delta E$, and map data of an electron having an energy of $E_0+10\Delta E$.

As described above, in the case where the interval of the measurement energies of seven channeltrons 42 is $\Delta E$, the maximum value of the measurement energy in the first map measurement is set to $E_0+3\Delta E$, the minimum value of the measurement energy in the second map measurement is set to $E_0+4\Delta E$, and a difference is set to $\Delta E$. With this, it is possible to make an energy resolution constant.

Also in the third or subsequent map measurement, the measurement energy range is set and the map measurement is performed similarly. Specifically, the measurement energy range of the j-th map measurement and the measurement energy range of the (j+1)th map measurement are set so as not to overlap each other. In addition, a difference between the maximum value of the measurement energies of n channeltrons 42 in the j-th map measurement and the minimum value of the measurement energies of n channeltrons 42 in the (j+1)th map measurement is set to be equal to the measurement energy interval of n channeltrons 42. Note that n, m, and j are natural numbers (positive integers), and satisfy 2≤n and 1≤j≤m. In addition, m does not have the upper limit value.

As described above, by repeating the map measurement m times in the varying measurement energy ranges, it is possible to obtain n×m pieces of map data. n×m pieces of map data (electron-spectroscopic images) obtained in this manner show distributions of electrons having energies which are different from each other.

Note that, while the number of times of the measurement m is set as an end condition of the map measurement in the above description, an energy which ends the measurement may also be set as the end condition. In addition, the first measurement energy $E_0$ or the measurement energy interval $\Delta E$ can be set to any value according to measurement conditions.

In the above description, the description has been given of the case of a constant analyzer energy (CAE) mode which makes energy when the electron passes through the electron spectrometer 30 constant, i.e., makes pass energy constant irrespective of the energy of the electron emitted from the specimen S. In the CAE mode, a potential difference applied between the inner hemispherical electrode 35a and the outer hemispherical electrode 35b is kept constant, and applied voltage of the input lens 32 is swept. In the CAE mode, all of the energy ranges have the same energy resolution $\Delta E$. That is, in the CAE mode, $\Delta E$ is constant.

In contrast to this, in the Auger electron microscope 100, it is also possible to perform the map measurement in a constant retarding ratio (CRR) mode which decelerates an electron at a constant ratio according to kinetic energy of the electron to be measured. In the CRR mode, a potential difference applied between the inner hemispherical electrode 35a and the outer hemispherical electrode 35b is swept together with the applied voltage of the input lens 32, and the electron is analyzed at a constant retarding ratio. In the CRR mode, the energy resolution $\Delta E$ changes in association with energy E. In the CRR mode, $\Delta E/E$ is constant.

In the CRR mode, the measurement energy range of one map measurement is proportional to the measurement energy of the channeltron 42 having 0ch. That is, when there are n channeltrons 42, in the case where $E_{j-1}$ denotes a median of the measurement energies of n channeltrons 42 in the j-th map measurement, and $\alpha$ denotes a value proportional to the deceleration rate of the input lens 32, a median $E_j$ of the measurement energies of n channeltrons 42 in the (j+1)th map measurement satisfies $$E_j = E_{j-1}(1+\alpha).$$

1.2.2. Generation of Spectral Map

The spectral map is generated based on obtained n×m pieces of map data. Specifically, as illustrated in FIG. 5, by extracting intensity data for each measurement point on the specimen from the obtained n×m pieces of map data, the spectrum is generated for each measurement point. Subsequently, the measurement point on the specimen and the spectrum are associated with each other and are stored in a storage section which is not shown. With this, the spectral map can be generated.

1.2.3. Correction of Detection Sensitivity of Electron Spectrometer

Next, a correction coefficient for correcting the detection sensitivity of the electron spectrometer 30 is determined. The detector 40 of the electron spectrometer 30 has n channeltrons 42. The n channeltrons 42 have different detection sensitivities. Accordingly, in the step of correcting the detection sensitivity of the electron spectrometer 30, the detection sensitivities of the n channeltrons 42 are corrected by determining the correction coefficient for correcting the detection sensitivity of the electron spectrometer 30. Hereinbelow, a description will be given of the step of correcting the detection sensitivity of the electron spectrometer 30.

First, the spectrum is obtained from the spectral map. In the step of obtaining the spectrum, for example, any area on the spectral map is selected, and the spectrum of the selected area is obtained. Note that the area of which the spectrum is obtained may be an area including one measurement point, or may also be an area including a plurality of adjacent measurement points. In addition, the area of which the spectrum is obtained may also be the whole spectral map. In this case, the spectrum is obtained by integrating spectra at all measurement points.

Figure 6:
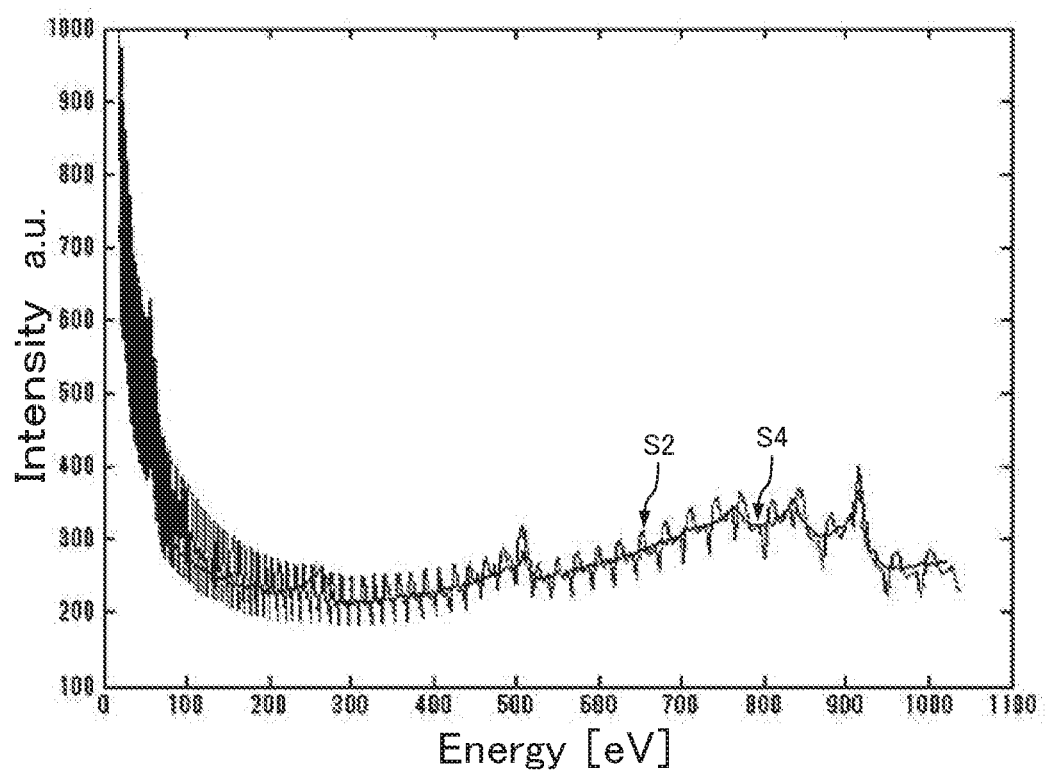
FIG. 6 is a graph illustrating a spectrum obtained from a spectral map.

FIG. 6 is a graph illustrating a spectrum (Auger spectrum) obtained from the spectral map. A spectrum S2 illustrated in FIG. 6 is a spectrum before sensitivity correction, and a spectrum S4 is a spectrum after the sensitivity correction. In FIG. 6, the measurement is performed in the CRR mode, and hence an energy step is proportional to the measurement energy. Note that the energy step can be set optionally.

Next, the correction coefficient is determined based on the spectrum obtained from the spectral map.

As illustrated in FIG. 6, the detection sensitivity differs from one channeltron 42 to another in the electron spectrometer 30, and hence fluctuations are seen in the intensity at a frequency corresponding to the number of measurement points which is equal to the number of channeltrons 42 in the spectrum S2. Accordingly, the detection sensitivity of each channeltron 42 is corrected by determining the correction coefficient. The correction coefficient is determined for each channeltron 42.

FIG. 7 is a table illustrating a relationship among the measurement energy, the channel used in the detection of the electron having the measurement energy, and the intensity of the electron detected by the channel in the spectrum S2.

Hereinbelow, a description will be given of the case where the correction coefficient of the channeltron 42 having 0ch is determined.

First, in the spectrum S2, n pieces of intensity data of consecutive measurement energies selected from measurement energies before and after the measurement energy of the channeltron 42 having 0ch, i.e., pieces of intensity data which are equal in number to the channeltrons 42 of the detector 40 are extracted. Herein, the detector 40 has the channeltrons 42 having −3ch to +3ch, and hence seven pieces of intensity data of consecutive measurement energies are obtained from the spectrum S2. For example, with a measurement energy of 20.37 eV used as the center, seven pieces of intensity data from 20.00 eV to 20.75 eV are obtained from the spectrum S2.

Next, a mean $I_A$ of seven pieces of intensity data is calculated.

$$I_A = (1000+883+752+710+681+687+609)/7 \approx 760.3$$

Next, a ratio between the mean $I_A$ and intensity data of the channeltron 42 having 0ch is calculated.

correction coefficient of 0ch=$I_A$/intensity of
0ch=760.3/710≈1.07

With this, it is possible to determine the correction coefficient of the channeltron 42 having 0ch.

Next, intensity data of the channeltron 42 having 0ch is corrected by using the calculated correction coefficient. As illustrated in the following expression, the correction of intensity data is performed by multiplying intensity data before correction by the correction coefficient.

intensity data after correction=intensity data before
correction×correction coefficient In an example described above, in the channeltron 42 having 0ch with the measurement energy of 20.37 eV, the correction coefficient is 1.07 and the intensity data before correction is 710, and hence the intensity data after correction is 710×1.07=759.7.

Herein, the detection sensitivity of the channeltron 42 also changes according to the measurement energy. Accordingly, by determining the correction coefficient of the channeltron 42 for each measurement energy, it is possible to correct a difference in the detection sensitivity of the channeltron 42 due to the measurement energy.

The correction coefficient of the channeltron 42 having 0ch when the measurement energy is 21.27 eV is as follows.

$I_A$=(972+867+737+698+667+677+604)/7≈746.0 correction coefficient of 0ch=$I_A$/intensity of
0ch=746.0/698≈1.07

The correction coefficient of the channeltron 42 having 0ch when the measurement energy is 1015.87 eV is as follows.

$I_A$=(283+290+267+253+258+263+230)/7≈263.4 correction coefficient of 0ch=$I_A$/intensity of
0ch=263.4/253≈1.04

In the manner described above, it is possible to determine the correction coefficient of the channeltron 42 having 0ch for each measurement energy.

It is possible to determine the correction coefficients of other channeltrons 42 in the same manner as in the case of the correction coefficient of the channeltron 42 having 0ch described above.

For example, the correction coefficient of the channeltron 42 having +1ch when the measurement energy is 20.50 eV is determined in the following manner.

$I_A$=(883+752+710+681+687+609+972)/7≈756.3 correction coefficient of +1ch=$I_A$/intensity
of +1ch=756.3/681≈1.11

In addition, for example, the correction coefficient of the channeltron 42 having +2ch when the measurement energy is 20.62 eV is determined in the following manner.

$I_A$=(752+710+681+687+609+972+867)/7≈754.0 correction coefficient of +2ch=$I_A$/intensity
of +2ch=754/687≈1.10

Thus, it is possible to determine the correction coefficient for each measurement energy for each channeltron 42.

By correcting the spectrum S2 with the correction coefficient determined in the above manner, it is possible to obtain the spectrum S4.

Note that, in the above description, while the description has been given of the case where the correction coefficient is determined by extracting n pieces of data of consecutive measurement energies from the spectrum S2, the correction coefficient may also be determined by extracting a multiple of n pieces of data of consecutive measurement energies from the spectrum S2.

In addition, in the above description, while the description has been given of the case where the measurement is performed in the CRR mode, it is possible to determine the correction coefficient by the same method in the case where the measurement is performed in the CAE mode.

Further, in the above description, while the correction coefficient is determined by calculating the mean of pieces of intensity data of three channels before and after the channel for which the correction coefficient is determined, the method for determining the correction coefficient is not particularly limited as long as the coefficient is determined by extracting a multiple of n pieces of intensity data of consecutive measurement energies.

1.3. Processing

A description will be given of processing of the processing section 60 in the Auger electron microscope 100. Herein, a description will be given of processing of generating the spectral map of the processing section 60.

First, the processing section 60 obtains n×m pieces of map data which are obtained by repeating, m times, the map measurement in which n pieces of map data are obtained, in the varying measurement energy ranges of the analyzer 34. The processing section 60 generates the spectral map based on the obtained n×m pieces of map data.

Next, the processing section 60 performs processing of correcting the sensitivity of the electron spectrometer 30. The processing section 60 generates the spectrum from the generated spectral map, and determines the correction coefficient based on the generated spectrum. The method for determining the correction coefficient is as described above. The processing section 60 corrects the spectrum by using the determined correction coefficient. The spectral map can be generated by the processing described above.

1.4. Effect

The analysis method according to the first embodiment includes the step of obtaining n×m pieces of map data by repeating, m times, the map measurement in which n pieces of map data are obtained by scanning the specimen S with the electron beam to detect the electron emitted from the specimen S with the detector 40, in the varying measurement energy ranges of the analyzer 34, and the step of generating the spectral map based on the n×m pieces of map data. Consequently, in the analysis method according to the first embodiment, it is possible to obtain the spectral map in a short period of time.

For example, in the case where the spectrum is obtained by performing point analysis at each measurement point in an analysis field and the spectral map is thereby generated, a waiting time period for stabilization after changing the value of electrode voltage or coil current in the electron spectrometer is required at each measurement point. For example, when the number of measurement points in the analysis field is increased, the number of times of waiting is increased as the number of measurement points is increased, and measurement time is increased. In contrast to this, in the analysis method according to the first embodiment, the above waiting time period is required for each scanning (for each map measurement), but it is not necessary to wait at each measurement point. In addition, even when the number of measurement points is increased, the number of times of waiting is not increased. Further, by increasing the number of channels of the detector 40, it is possible to achieve a reduction in measurement time. Consequently, in the analysis method according to the first embodiment, it is possible to obtain the spectral map in a short period of time.

In the analysis method according to the first embodiment, the measurement energies of the individual channeltrons 42 do not overlap each other in the map measurement which is performed m times. That is, even when the map measurement is repeated m times, the measurement energies set in n channeltrons 42 are different from each other. Consequently, in the analysis method according to the first embodiment, it is possible to reduce the measurement time. For example, when the measurement energies of the channeltrons 42 overlap each other in the map measurement which is performed m times, the measurement time is increased correspondingly.

In the analysis method according to the first embodiment, the measurement energy range set in the j-th map measurement and the measurement energy range set in the (j+1)th map measurement do not overlap each other. Consequently, in the analysis method according to the first embodiment, it is possible to easily correct the detection sensitivity of the electron spectrometer 30 by using the above-described method.

The analysis method according to the first embodiment includes the step of determining the correction coefficient for correcting the detection sensitivity of the electron spectrometer 30. In the step of determining the correction coefficient, the correction coefficient is determined based on the spectrum obtained from the generated spectral map. Consequently, in the analysis method according to the first embodiment, it is not necessary to perform measurement for correcting the sensitivity of the electron spectrometer 30.

For example, when the measurement for correcting the sensitivity of the electron spectrometer 30 is performed in addition to the measurement for obtaining the spectral map, the specimen S may be damaged. In addition, when the measurement for correcting the sensitivity of the electron spectrometer 30 is performed with another specimen, there are cases where the sensitivity cannot be corrected accurately. In contrast to this, in the analysis method according to the first embodiment, the spectrum is obtained from the obtained spectral map and the sensitivity of the electron spectrometer 30 is corrected, and hence such a problem does not occur. Further, the measurement for correcting the sensitivity of the electron spectrometer 30 is not necessary, and hence it is possible to reduce the measurement time.

In the analysis method according to the first embodiment, the correction coefficient is determined for each channeltron 42. With this, it is possible to correct a difference in the detection sensitivity of the channeltron 42.

In the analysis method according to the first embodiment, the correction coefficient is determined for each measurement energy. With this, it is possible to correct a difference in the detection sensitivity of the channeltron 42 due to a difference in measurement energy.

In the analysis method according to the first embodiment, in the step of determining the correction coefficient, a multiple of n pieces of data of consecutive measurement energies are extracted from the obtained spectrum, and the sensitivity of the electron spectrometer 30 is corrected. With this, the numbers of pieces of data of the individual channeltrons 42 included in the extracted data are equal to each other, and hence it is possible to correct a difference in detection sensitivity between the n channeltrons 42.

1.5. Modification

Next, a description will be given of modifications of the analysis method according to the first embodiment. In the following description, a description will be given of points different from those of the analysis method according to the first embodiment described above, and the description of points similar to those thereof will be omitted.

1.5.1. First Modification

The method for correcting the detection sensitivity of the electron spectrometer 30 is not limited to the method described in "1.2.3. Correction of Detection Sensitivity of Electron Spectrometer" described above.

In the method described in "1.2.3. Correction of Detection Sensitivity of Electron Spectrometer" described above, the correction coefficient is based on the premise that the intensity of the observed electron is constant, and hence, in an energy range in which intensity significantly changes depending on energy such as the Auger peak, it is not possible to calculate the correction coefficient accurately. In a first modification, by modifying the spectrum and calculating the correction coefficient based on the modified spectrum, an influence of the change of the intensity is reduced. Hereinbelow, its principle will be described. Note that, in the following description, a description will be given of the case where the number of channels is 2 (n=2).

Figure 8:
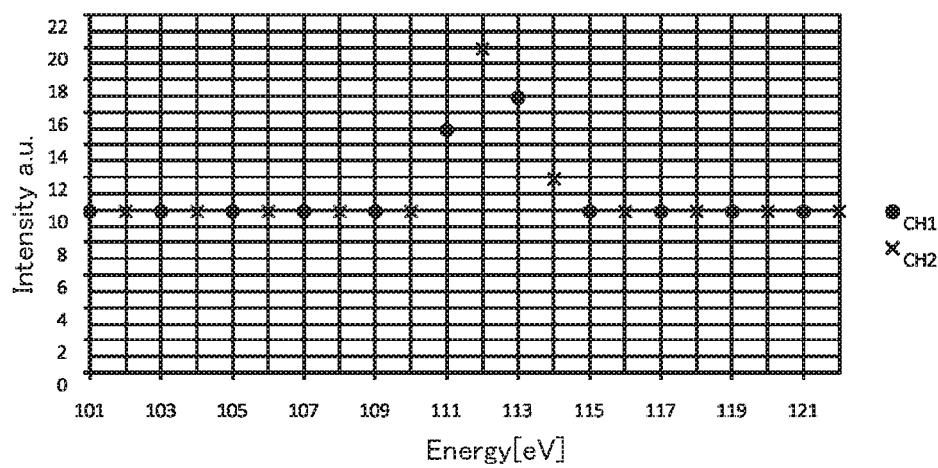
FIG. 8 is a graph for explaining an analysis method according to the first modification.

FIGS. 8 to 18 are graphs for explaining an analysis method according to the first modification. FIG. 8 illustrates a true spectrum. In FIG. 8, a peak is observed when the measurement energy is in the vicinity of 112.

Figure 9:
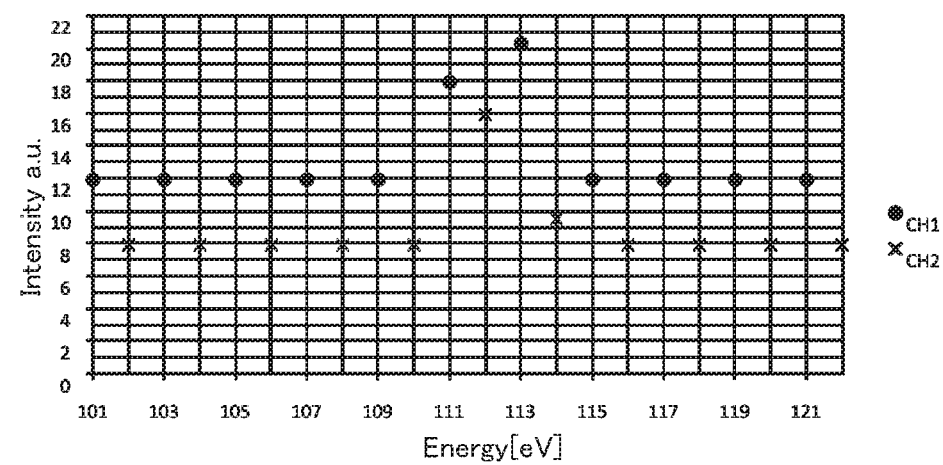
FIG. 9 is a graph for explaining an analysis method according to the first modification.

FIG. 9 illustrates a spectrum before correction. The detection sensitivities of the channeltron 42 having 1ch and the channeltron 42 having 2ch are different from each other. As illustrated in FIG. 9, the intensity of a background area of the spectrum of 1ch is higher than the intensity of a background area of intensity data of the spectrum of 2ch. This is because the detection sensitivity of the channeltron 42 having 1ch is higher than the detection sensitivity of the channeltron 42 having 2ch.

Figure 10:
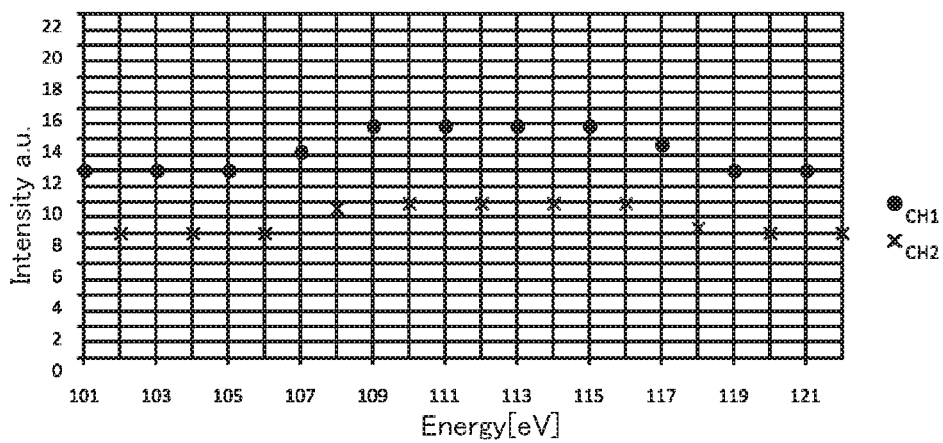
FIG. 10 is a graph for explaining an analysis method according to the first modification.

FIG. 10 illustrates a spectrum obtained by calculating a mean of five points before and after each point in each of the spectrum of 1ch and the spectrum of 2ch illustrated in FIG. 9.

Figure 11:
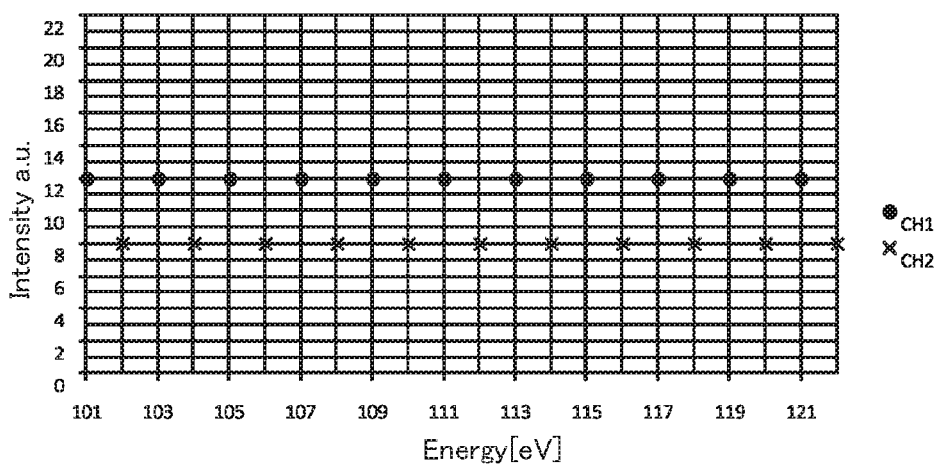
FIG. 11 is a graph for explaining an analysis method according to the first modification.

FIG. 11 illustrates a spectrum obtained by calculating a median of five points before and after each point in each of the spectrum of 1ch and the spectrum of 2ch illustrated in FIG. 9.

In each of FIGS. 10 and 11, a peak portion of the spectrum is lowered.

Figure 12:
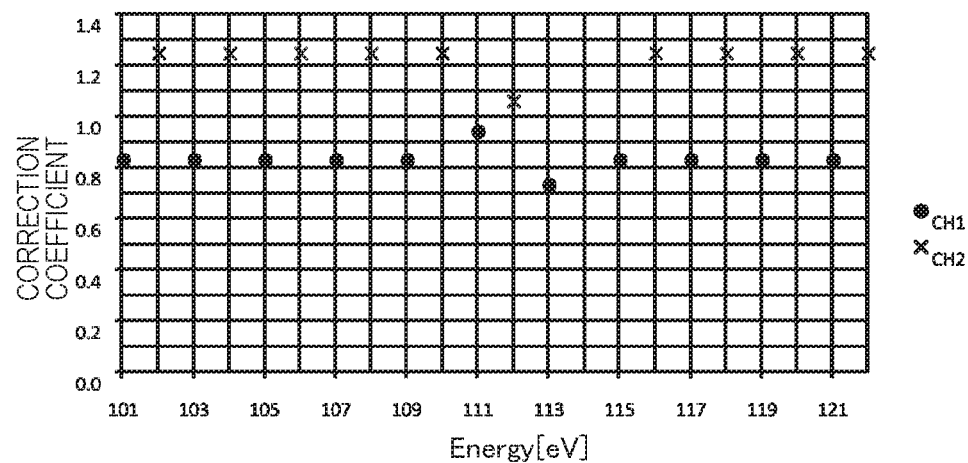
FIG. 12 is a graph for explaining an analysis method according to the first modification.
Figure 13:
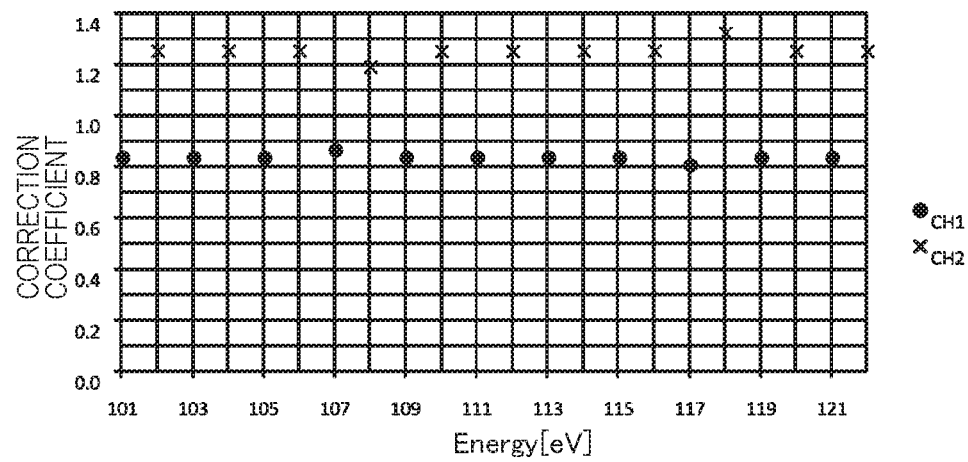
FIG. 13 is a graph for explaining an analysis method according to the first modification.
Figure 14:
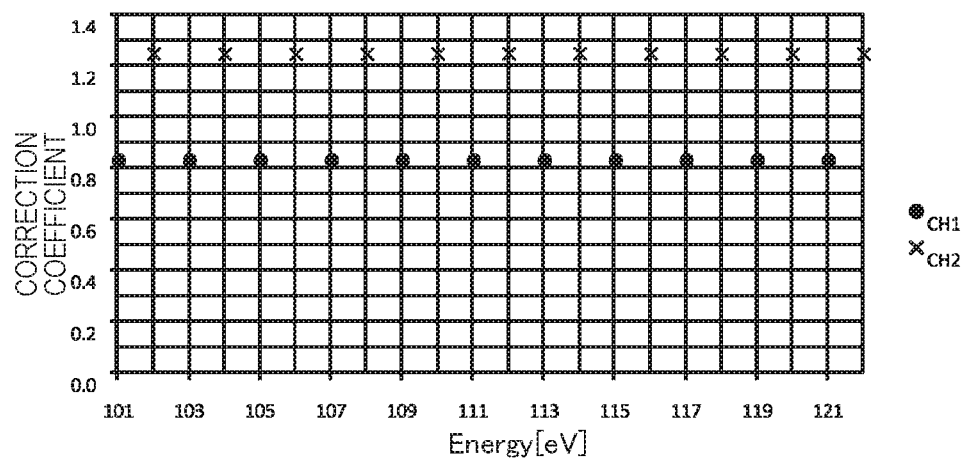
FIG. 14 is a graph for explaining an analysis method according to the first modification.

FIG. 12 illustrates a result of calculation of the correction coefficient which uses the spectrum illustrated in FIG. 9. FIG. 13 illustrates a result of calculation of the correction coefficient which uses the spectrum illustrated in FIG. 10. FIG. 14 illustrates a result of calculation of the correction coefficient which uses the spectrum illustrated in FIG. 11. In a calculation method of the correction coefficient, as described in "1.2.3. Correction of Detection Sensitivity of Electron Spectrometer", the correction coefficient is calculated from the ratio between the intensity of the measurement energy and the mean $I_A$.

In each of FIGS. 13 and 14, an influence of a peak portion of a spectrum is lowered.

Figure 15:
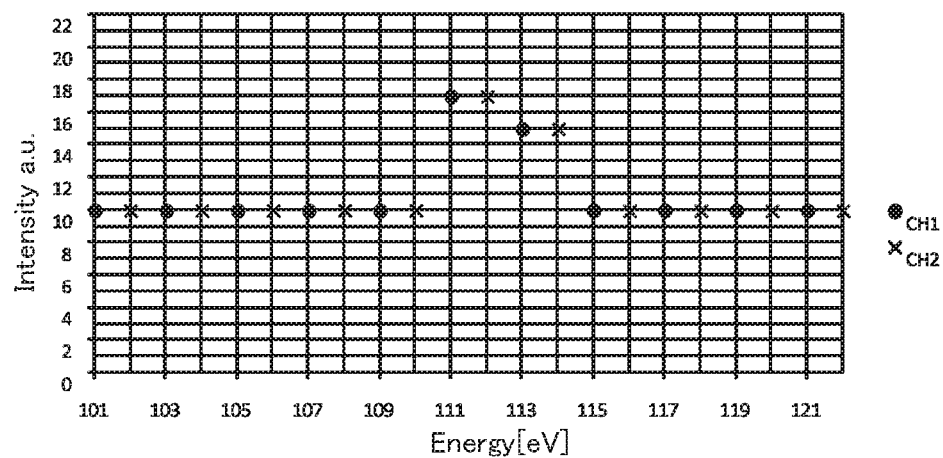
FIG. 15 is a graph for explaining an analysis method according to the first modification.
Figure 16:
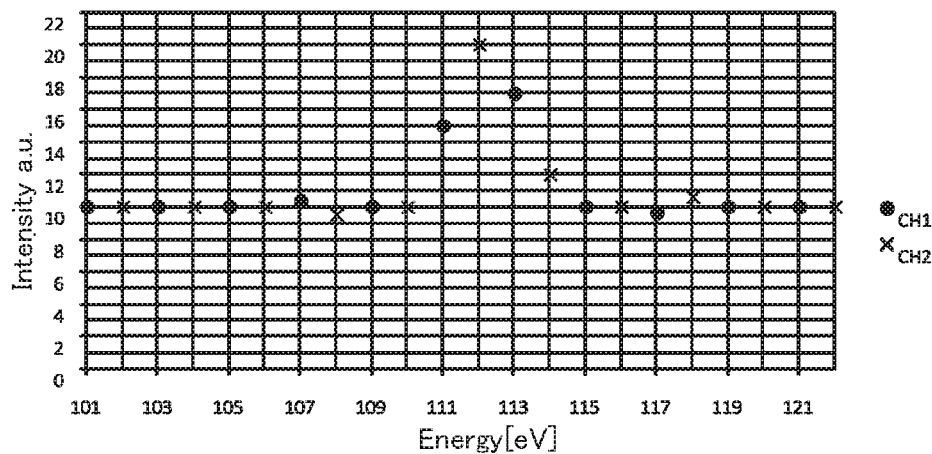
FIG. 16 is a graph for explaining an analysis method according to the first modification.
Figure 17:
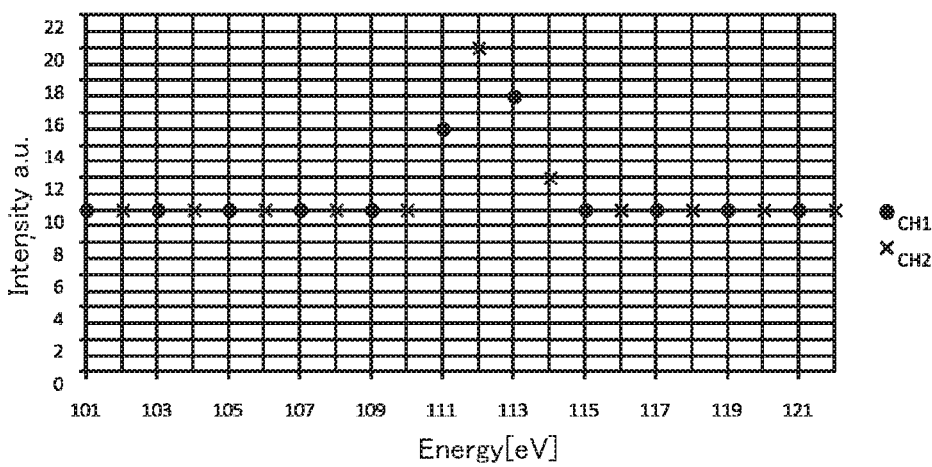
FIG. 17 is a graph for explaining an analysis method according to the first modification.

FIG. 15 illustrates a spectrum obtained by correcting the spectrum in FIG. 9 by using the correction coefficient in FIG. 12. FIG. 16 illustrates a spectrum obtained by correcting the spectrum in FIG. 9 by using the correction coefficient in FIG. 13. FIG. 17 illustrates a spectrum obtained by correcting the spectrum in FIG. 9 by using the correction coefficient in FIG. 4. As described in "1.2.3. Correction of Detection Sensitivity of Electron Spectrometer", the correction of the spectrum is performed by multiplying the intensity of the spectrum before correction by the correction coefficient.

Figure 18:
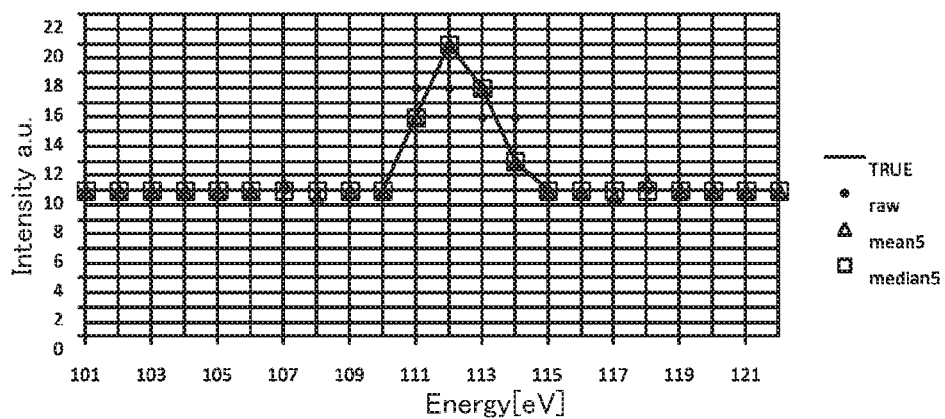
FIG. 18 is a graph for explaining an analysis method according to the first modification.

FIG. 18 is a graph for comparing the true spectrum (TRUE) illustrated in FIG. 8, the spectrum (raw) illustrated in FIG. 15, the spectrum (mean 5) illustrated in FIG. 16, and the spectrum (median 5) illustrated in FIG. 17.

As illustrated in FIGS. 15 to 18, it is possible to reduce an influence of a peak by modifying the spectrum by using the mean or the median and calculating the correction coefficient. Particularly in this example, it is possible to reduce the influence of the peak by using the median.

In the above description, the description has been given of the case where the spectrum is modified by using the mean and the median of the spectrum. When the spectrum is modified by using the mean, an effect of reducing an influence by statistical noise of the spectrum is expected to be achieved. When the median is used, it is possible to reduce the influence of the peak. Note that processing of modifying the spectrum is not limited to processing which uses the mean or the median, and other processing may also be used. For example, a spline function may be subjected to fitting by the least-squares method.

1.5.2. Second Modification

The method for correcting the detection sensitivity of the electron spectrometer 30 is not limited to the method described in "1.2.3. Correction of Detection Sensitivity of Electron Spectrometer" described above. Hereinbelow, a description will be given of an analysis method according to a second modification.

First, the spectrum is obtained from the spectral map.

Next, a moving average of the spectrum is calculated, and a moving average spectrum is generated.

Figure 19:
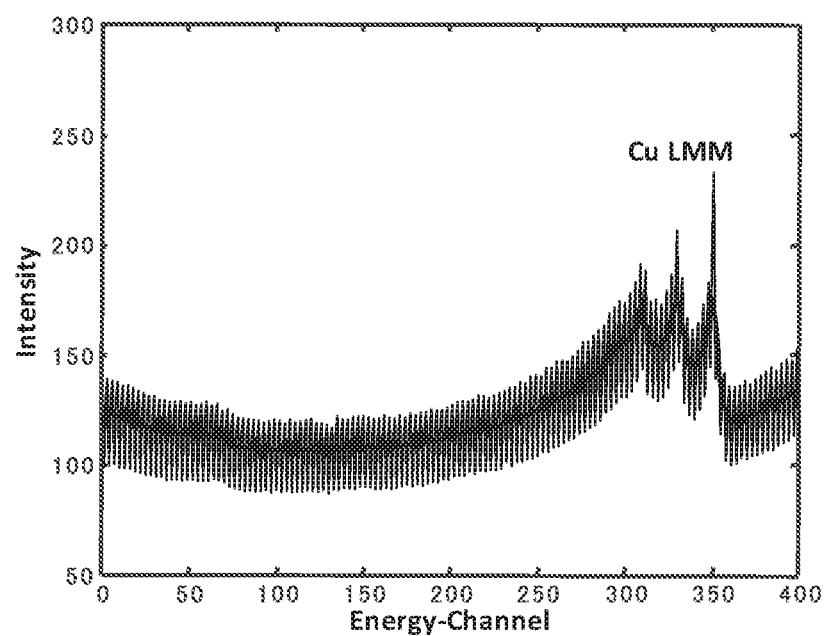
FIG. 19 is a graph illustrating a spectrum obtained from a spectral map and a spectrum obtained by calculating a moving average of the spectrum.

FIG. 19 illustrates the spectrum obtained from the spectral map and the moving average spectrum obtained by calculating the moving average of the spectrum. In FIG. 19, Energy-Channel denotes an index of a channel before being converted into an energy value. Note that the spectrum obtained from the spectral map illustrated in FIG. 19 is the spectrum obtained with the spectral map of three channels. The spectral map of three channels denotes the spectral map obtained by performing the map measurement by using three channeltrons 42 (n=3).

In the case where the map measurement is performed by using n channeltrons 42, the moving average corresponding to a multiple of n is calculated. In FIG. 19, there are three channeltrons 42, and the moving average corresponding to 6ch (intensity data of six consecutive measurement energies) is calculated. By calculating the moving average of the spectrum, it is possible to reduce an influence of variations in the detection sensitivity of the channeltron 42.

Note that white noise (statistical noise) of the spectrum may be eliminated by using a PCA filter or the like.

Figure 20:
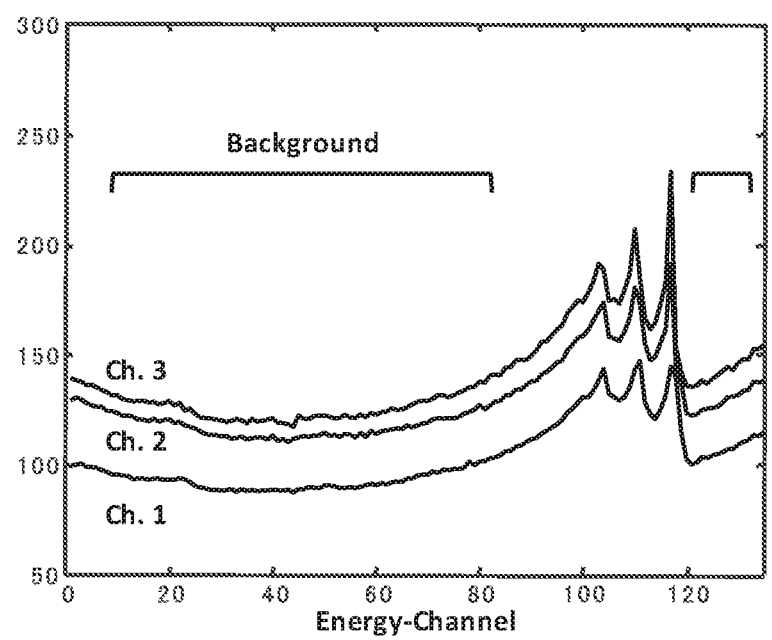
FIG. 20 is a graph illustrating a spectrum of 1ch, a spectrum of 2ch, and a spectrum of 3ch.

Next, by plotting pieces of intensity data of three channeltrons 42 individually, three single channel spectra are obtained. FIG. 20 is a graph illustrating a spectrum of 1ch obtained by plotting the intensity data of the channeltron 42 having 1ch, a spectrum of 2ch obtained by plotting the intensity data of the channeltron 42 having 2ch, and a spectrum of 3ch obtained by plotting the intensity data of the channeltron 42 having 3ch.

Next, a signal having the same energy value as that of the spectrum of 1 ch is extracted from the moving average spectrum, and the moving average spectrum corresponding to the spectrum of 1ch is generated. Similarly, the moving average spectrum corresponding to the spectrum of 2ch and the moving average spectrum corresponding to the spectrum of 3ch are generated.

Next, the detection sensitivity of each channeltron is corrected by using the background area of the spectrum. The correction of the detection sensitivity is performed by causing the intensity of the background area of the spectrum of each channel to match the intensity of the background area of the moving average spectrum.

Herein, suppose that a curve indicative of the intensity of the background area of the spectrum (background curve) approximately coincides with the moving average spectrum.

Figure 21:
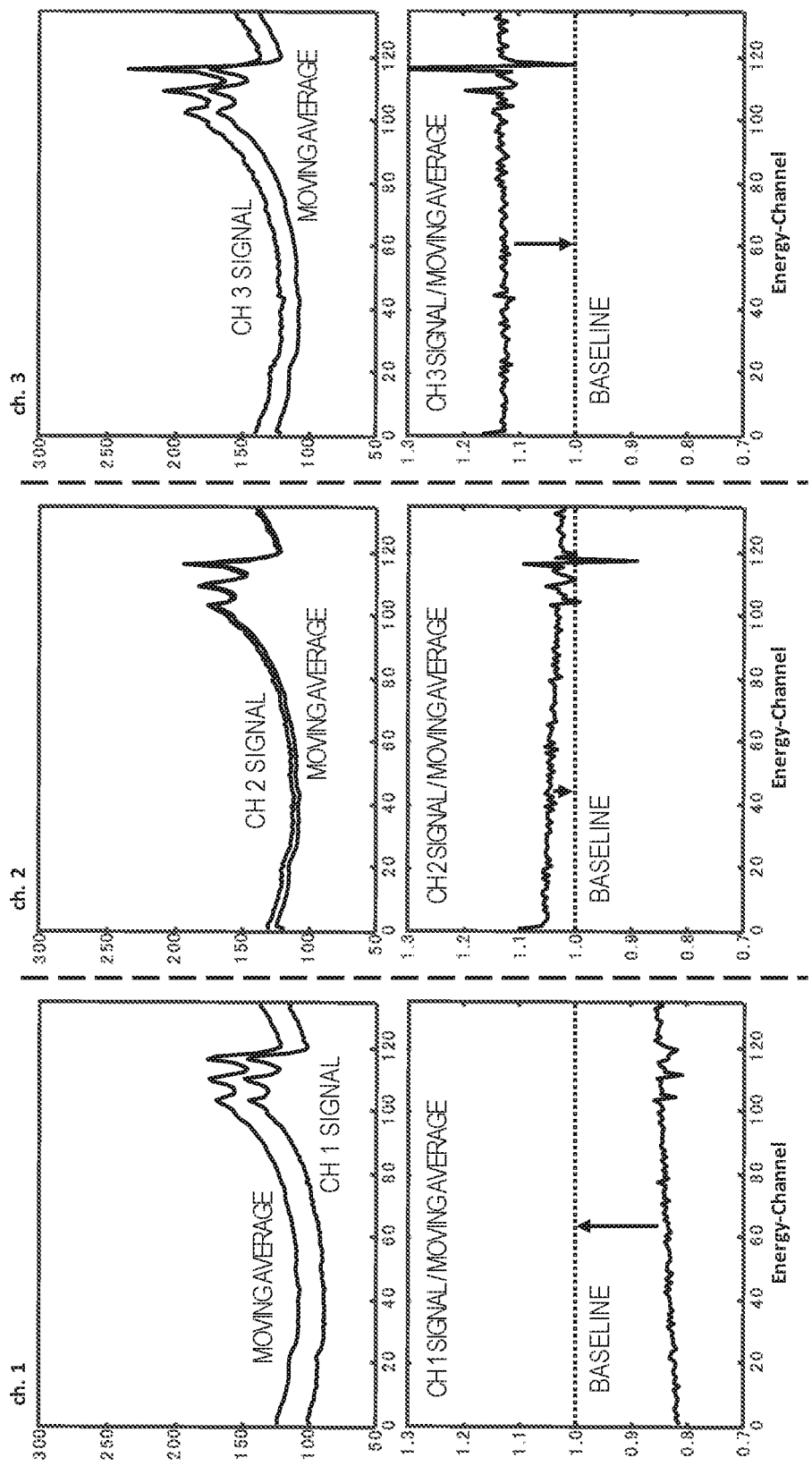
FIG. 21 illustrates graphs for explaining processing of correcting a detection sensitivity of each channel.

FIG. 21 illustrates graphs for explaining processing of correcting the detection sensitivity of each channel.

As illustrated in FIG. 21, the intensity data of each channel is divided by the moving average. When the intensity data of each channel is divided by the moving average, a value changes sharply in a peak area of the spectrum. To cope with this, filtering processing and smoothing processing are performed in order to neglect the peak area.

After the above processing is performed on each spectrum, the spectrum is caused to match the moving average. With this, it is possible to correct the detection sensitivity of each channeltron 42. A coefficient by which the spectrum is multiplied for causing the spectrum to match the moving average serves as the correction coefficient.

Figure 22:
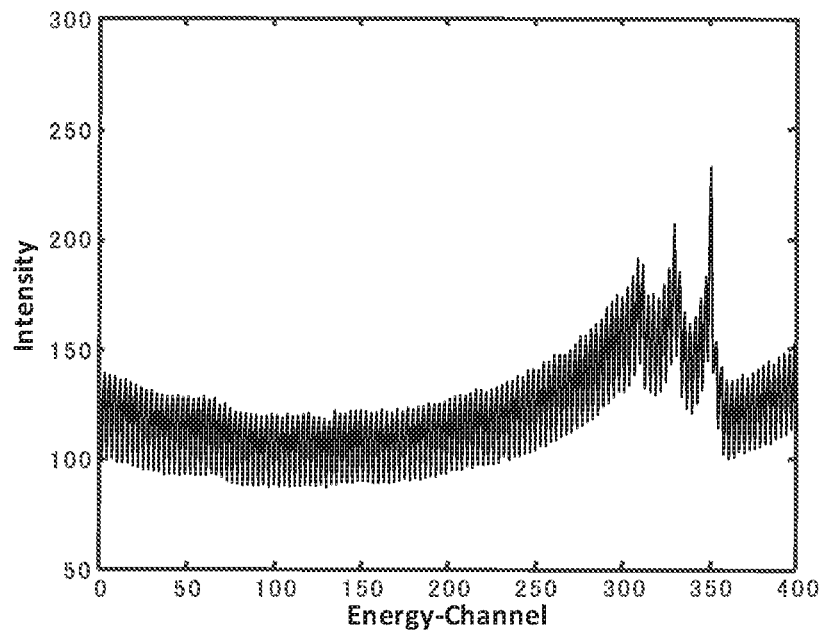
FIG. 22 is a graph illustrating a spectrum before correction.
Figure 23:
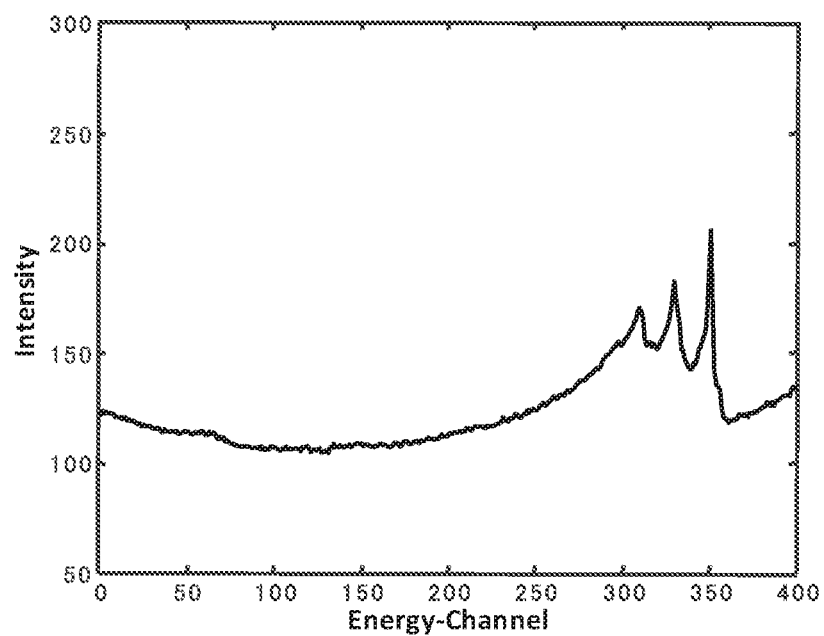
FIG. 23 is a graph illustrating a spectrum after correction.

FIG. 22 is a graph illustrating a spectrum before the detection sensitivity of each channeltron is corrected, and FIG. 23 is a graph illustrating a spectrum after the detection sensitivity of each channeltron is corrected.

According to the second modification, as illustrated in FIGS. 22 and 23, it is possible to correct the detection sensitivity of the electron spectrometer 30.

1.5.3. Third Modification

In the first embodiment described above, the correction coefficient is determined by using the spectrum extracted from any area of the spectral map.

In a third modification, a generated spectral map is partitioned into a plurality of areas, a spectrum is obtained for each area, and a correction coefficient is determined for each area.

In the electron spectrometer 30, depending on a difference in the position of the measurement point on the specimen S, the amount of electrons which can be taken into the input lens 32 differs. For example, in the case where the position of the measurement point on the specimen S is in the vicinity of a straight line passing through the optical axis of the input lens 32, the amount of electrons which can be taken into the input lens 32 is large and, in the case where the position of the measurement point on the specimen S is distant from the straight line, the amount of electrons which can be taken into the input lens 32 is small. Accordingly, in the electron spectrometer 30, the detection sensitivity differs depending on the position of the measurement point. To cope with this, in the third modification, a difference in detection sensitivity due to the position of the measurement point is corrected by partitioning the spectral map into a plurality of areas and determining the correction coefficient for each area.

Figure 24:
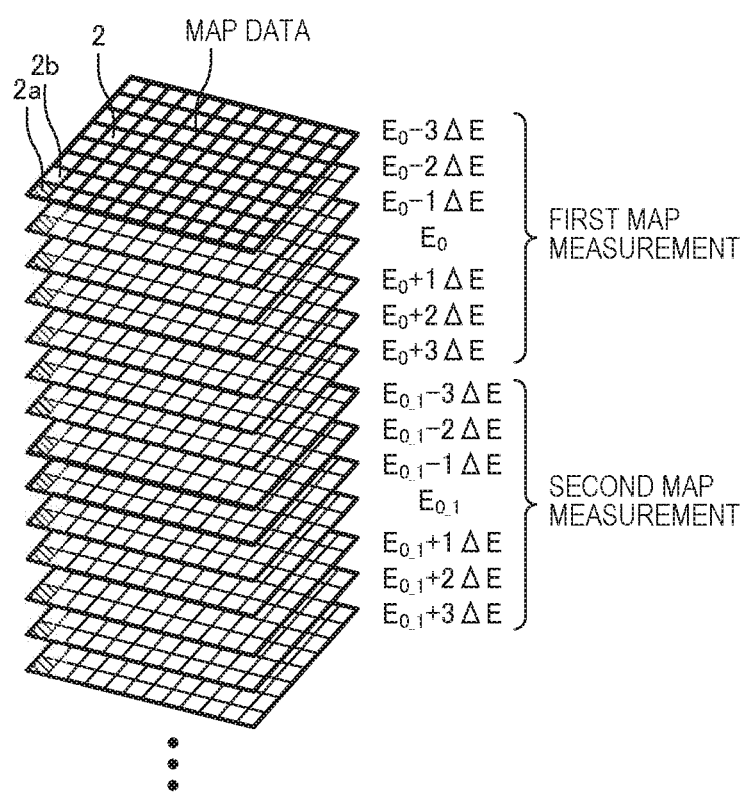
FIG. 24 is a diagram for explaining an analysis method according to the third modification.

FIG. 24 is a diagram for explaining an analysis method according to the third modification.

First, in the third modification, as illustrated in FIG. 24, the spectral map is partitioned into a plurality of areas 2. One area 2 may be an area including one measurement point, or may also be an area including a plurality of adjacent measurement points.

Next, a spectrum is obtained from a first area 2a, and a correction coefficient is determined by using the method described in "1.2.3. Correction of Detection Sensitivity of Electron Spectrometer" described above. Subsequently, the spectrum is corrected by using the determined correction coefficient. With this, in the first area 2a, it is possible to correct the detection sensitivity of the electron spectrometer 30.

Next, a spectrum is obtained from a second area 2b and, similarly to the first area 2a, the correction of the detection sensitivity of the electron spectrometer 30 is performed. The correction of the detection sensitivity of the electron spectrometer 30 is performed in each of other areas 2 in the same manner. With this, it is possible to correct the detection sensitivity of the electron spectrometer 30 for each area 2.

Note that the detection sensitivity of the electron spectrometer 30 continuously changes according to the position of the measurement point. To cope with this, for example, when the correction coefficient of the first area 2a is determined, the correction coefficient of the first area 2a may be determined by modifying the spectrum by using a mean or a median with the spectrum of the adjacent area 2 instead of using the spectrum obtained from the first area 2a without altering it. As the method for modifying the spectrum by using the mean or the median, it is possible to use the same method as the method described in the second modification.

In the third modification, the generated spectral map is partitioned into a plurality of the areas 2, the spectrum is obtained for each area 2, and the correction coefficient is determined for each area 2. Consequently, in the third modification, it is possible to correct also a difference in detection sensitivity due to the position of the measurement point.

Note that the third modification can also be applied to the first modification and the second modification described above.

2. Second Embodiment

2.1. Auger Electron Microscope

The configuration of the Auger electron microscope used in an analysis method according to a second embodiment is the same as that of the Auger electron microscope 100 illustrated in FIG. 1 described above, and hence the description thereof will be omitted. The processing section 60 performs processing of correcting drift of the analysis field described below.

2.2. Analysis Method

Figure 25:
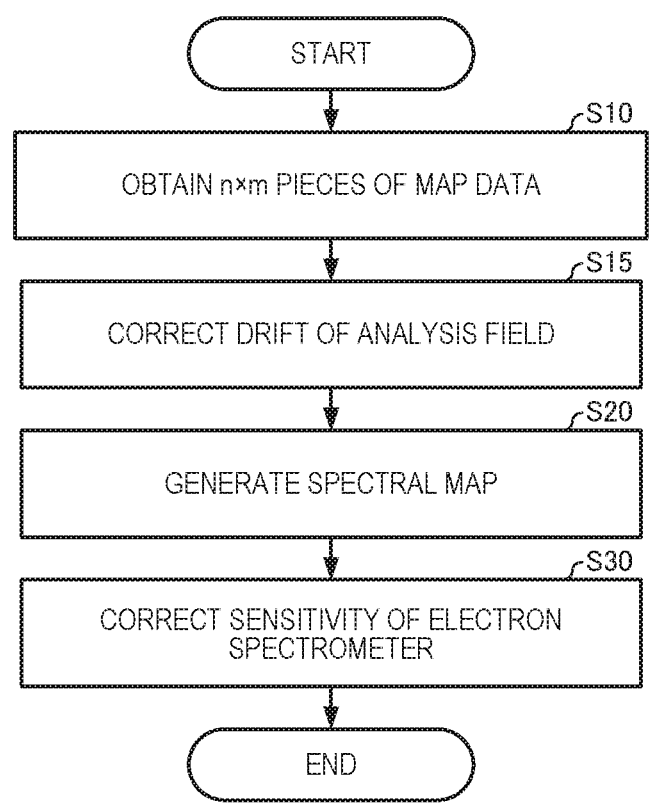
FIG. 25 is a flowchart illustrating an example of an analysis method according to the second embodiment.

FIG. 25 is a flowchart illustrating an example of the analysis method according to the second embodiment. As illustrated in FIG. 25, the analysis method according to the second embodiment includes the step S15 of correcting the drift of the analysis field. In the following description, a description will be given of points different from those of the example of the analysis method according to the first embodiment described above, and the description of points similar to those of the example thereof will be omitted.

In the Auger electron microscope 100, as drift correction of the analysis field, drift correction performed during the map measurement and drift correction performed after the map measurement are performed.

(1) Drift Correction During Map Measurement

Figure 26:
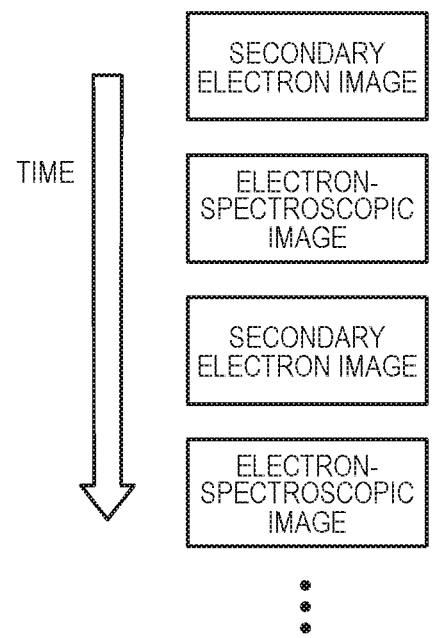
FIG. 26 is a diagram for explaining drift correction during a map measurement.

FIG. 26 is a diagram for explaining the drift correction during the map measurement.

The drift correction during the map measurement is performed by using probe tracking. The probe tracking is the function of detecting displacement of the irradiation position of the electron beam applied to the specimen S, and performing the map measurement while correcting the displacement.

For example, as illustrated in FIG. 26, secondary electron images and electron-spectroscopic images (map data) obtained in the map measurement are alternately obtained. When the secondary electron image is obtained, an amount of drift is calculated by comparing the obtained secondary electron image with a secondary electron image serving as a reference. Subsequently, based on the calculated amount of drift, the analysis field is moved by moving the irradiation position of the electron beam or moving the specimen stage 20. With this, it is possible to correct the drift of the analysis field. The secondary electron image serving as the reference is the secondary electron image which is obtained in advance. Note that the secondary electron image serving as the reference may also be an immediately previously obtained secondary electron image. That is, the secondary electron image serving as the reference which is compared with the secondary electron image obtained in the N-th map measurement may be the secondary electron image obtained in the (N−1)th map measurement.

Figure 27:
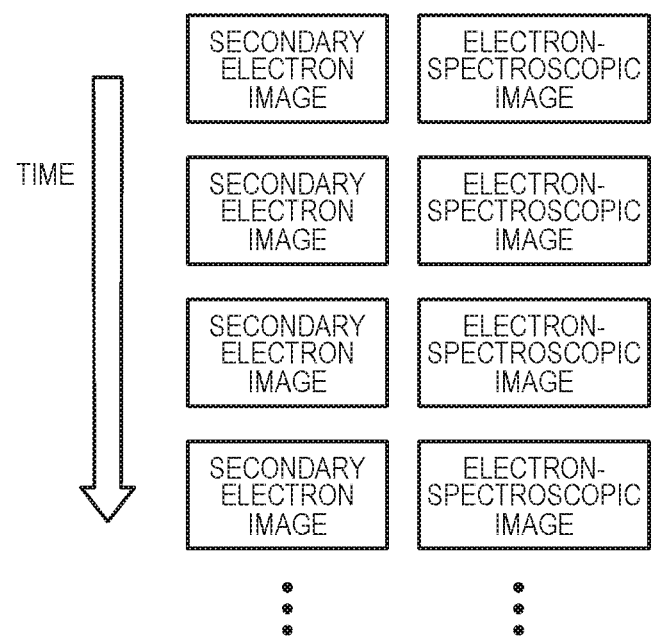
FIG. 27 is a diagram for explaining a modification of drift correction during a map measurement.

Note that, as illustrated in FIG. 27, the secondary electron image may be obtained concurrently with the map measurement. With this, it is possible to reduce the measurement time. In addition, the same drift information as that of the map measurement is provided, and hence it is possible to improve the accuracy of the drift correction.

(2) Drift Correction after Map Measurement (Step S15)

As illustrated in FIG. 25, the drift correction after the map measurement is performed after the step S10 of obtaining n×m pieces of map data. In the step of correcting the drift of the analysis field after the map measurement, n×m electron-spectroscopic images are generated based on n×m pieces of map data, and the drift of the analysis field is corrected by comparing each of the n×m electron-spectroscopic images with each of images serving as references. That is, the drift correction is performed for each piece of map data (each electron-spectroscopic image).

Figure 28:
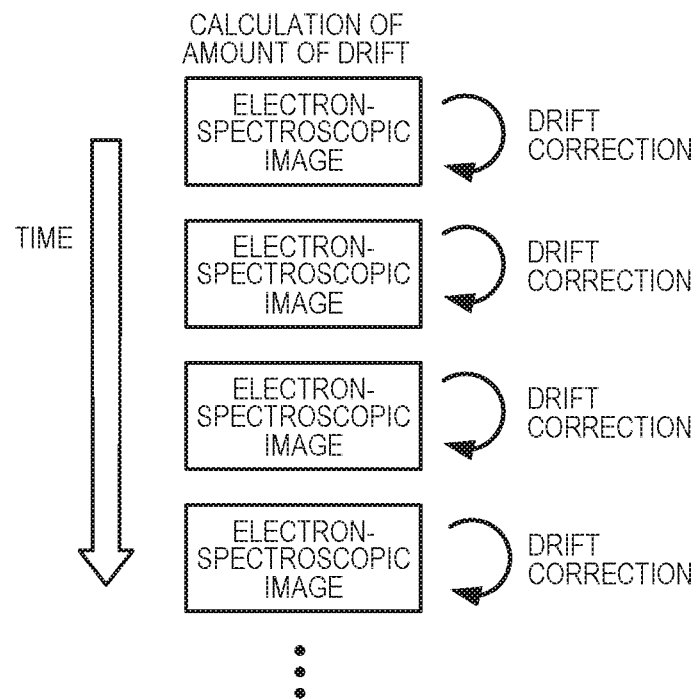
FIG. 28 is a diagram for explaining drift correction after a map measurement.

FIG. 28 is a diagram for explaining the drift correction after the map measurement.

As illustrated in FIG. 28, the drift correction based on image processing is performed by using the electron-spectroscopic image obtained in the map measurement. As described above, even when the drift correction which uses probe tracking is performed during the map measurement, in the case where the drift has occurred during a time period from the end of the probe tracking to the start of the next probe tracking, map data is influenced by the drift. To cope with this, after the map measurement, the drift correction is performed by using the electron-spectroscopic image which is the measurement result.

Specifically, by comparing the electron-spectroscopic image obtained in the map measurement with the image serving as the reference, the amount of drift between the images is calculated. As the image serving as the reference, it is possible to use, e.g., the electron-spectroscopic image obtained in the first map measurement. In addition, as the image serving as the reference, the electron-spectroscopic image which is obtained in advance before the measurement for generating the spectral map may also be used.

It is possible to apply the same calculation method as the calculation method of the amount of drift used in the probe tracking to the calculation of the amount of drift between the images. In addition, as the calculation of the amount of drift between the images, calculation in which affine transformation including not only parallel translation but also rotation, scaling, and shearing, non-linear distortion, and local distortion are taken into consideration may be performed.

Figure 29:
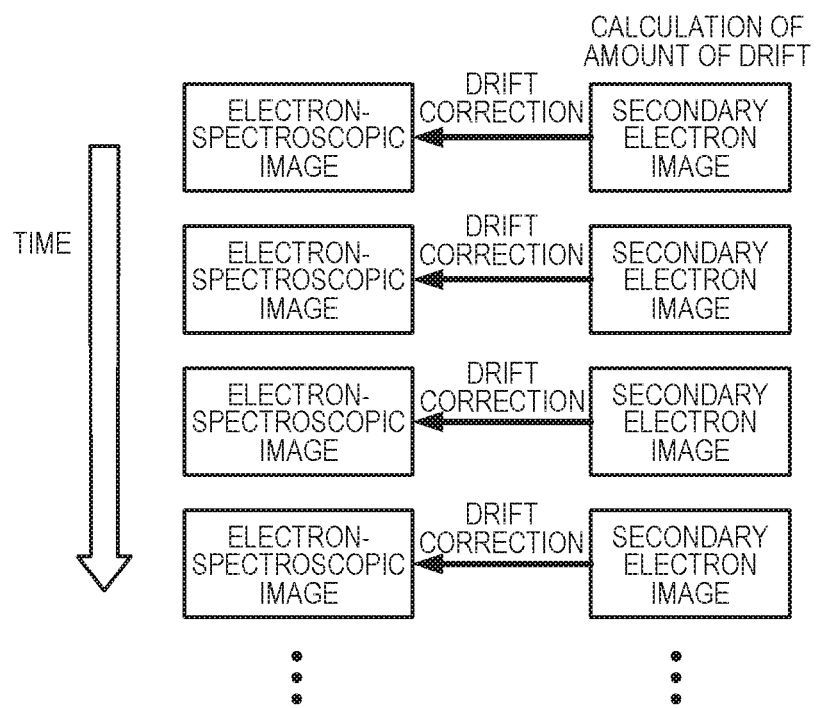
FIG. 29 is a diagram for explaining a modification of drift correction after a map measurement.

Note that the electron-spectroscopic images obtained in the map measurement have measurement energies which are different from each other, and hence there are cases where the contrast or brightness of the image differs. To cope with this, for example, as illustrated in FIG. 29, the calculation of the amount of drift between the images may be performed with the secondary electron image which is obtained concurrently with the electron-spectroscopic image.

In addition, for example, in the case of the measurement energy having a low intensity of the electron, there are cases where the contrast of the electron-spectroscopic image is low and the amount of drift cannot be calculated accurately. In such cases, it is possible to calculate the amount of drift with high accuracy by performing the calculation of the amount of drift with the secondary electron image obtained concurrently with the electron-spectroscopic image.

In the above description, while the description has been given of the case where the calculation of the amount of drift is performed with the secondary electron image obtained concurrently with the electron-spectroscopic image, the image is not limited to the secondary electron image as long as the image can be obtained concurrently with the electron-spectroscopic image. For example, a backscattered electron image may be obtained concurrently with the electron-spectroscopic image, and the calculation of the amount of drift may be performed with the backscattered electron image.

2.3. Effect

The analysis method according to the second embodiment includes the step of correcting the drift of the analysis field. In the step of correcting the drift of the analysis field, the electron-spectroscopic image is generated for each piece of map data based on map data, the electron-spectroscopic image generated for each piece of map data is compared with the spectroscopic image serving as the reference, and the drift of the analysis field is corrected. Thus, in the analysis method according to the second embodiment, the drift correction is performed by using the electron-spectroscopic image for generating the spectral map, and hence it is not necessary to obtain the image for the drift correction. In addition, by using the electron-spectroscopic image, it is possible to correct not only linear drift but also non-linear distortion or local distortion.

3. Third Embodiment 3.1. Auger Electron Microscope

The configuration of the Auger electron microscope used in an analysis method according to a third embodiment is the same as that of the Auger electron microscope 100 illustrated in FIG. 1 described above, and hence the description thereof will be omitted.

3.2. Analysis Method

Next, a description will be given of the analysis method according to the third embodiment. In the analysis method according to the third embodiment, the step S10 of obtaining n×m pieces of map data illustrated in FIG. 4 and the step S30 of correcting the sensitivity of the electron spectrometer 30 illustrated in FIG. 4 are different from those of the analysis method according to the first embodiment. In the following description, a description will be given of points different from those of the example of the analysis method according to the first embodiment described above, and the description of points similar to those of the example thereof will be omitted.

3.2.1. Obtainment of Map Data

In the analysis method according to the third embodiment, similarly to the analysis method according to the first embodiment, the measurement energies of the channeltrons 42 do not overlap each other in the map measurement which is performed m times. In addition, in the analysis method according to the third embodiment, in the step of obtaining n×m pieces of map data, in the case where $\Delta E$ denotes the measurement energy interval between adjacent channeltrons 42, the step of repeating the map measurement m/a times while shifting the measurement energy range by n×$\Delta E$ such that the measurement energy interval is $\Delta E$ is performed a times while the measurement energy range is shifted by $\Delta E/a$. Note that a is a positive integer satisfying m>a, and m is a multiple of a.

Figure 30:
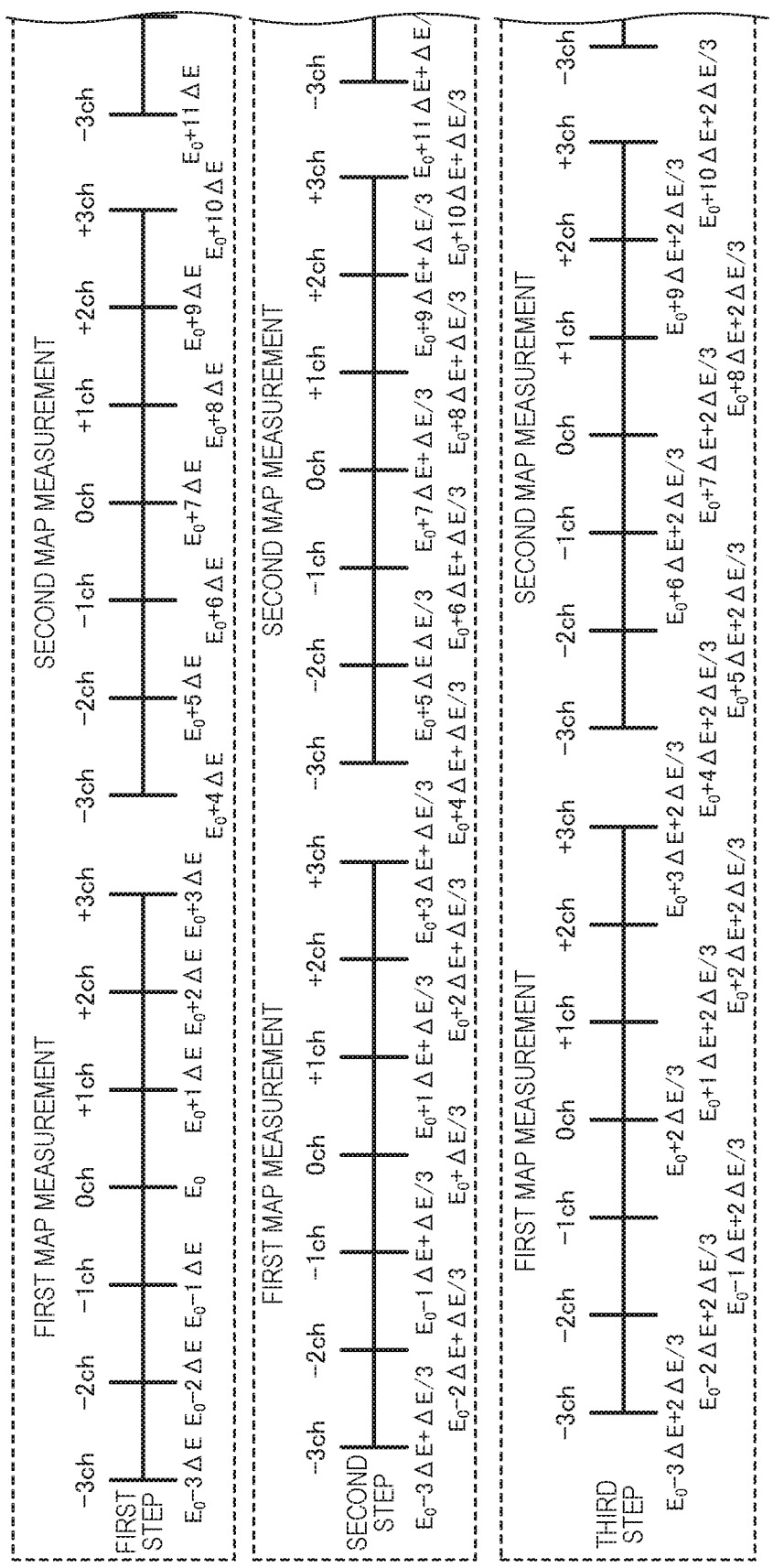
FIG. 30 is a diagram for explaining an analysis method according to the third embodiment.

FIG. 30 is a diagram for explaining the analysis method according to the third embodiment. Note that FIG. 30 illustrates the case where a=3 is satisfied.

First, as illustrated in FIG. 30, the first step of repeating the map measurement m/a times (hereinafter also referred to as "the step of repeating the map measurement") while shifting the measurement energy range by n×$\Delta E$ such that the measurement energy interval is $\Delta E$ is performed. The step of repeating the map measurement is performed in the same manner as in the first embodiment described above. That is, in the step of repeating the map measurement, the measurement energy range of the first map measurement and the measurement energy range of the second map measurement are set such that the measurement energy range of the second map measurement is shifted by n×$\Delta E$ from the measurement energy range of the first map measurement.

Specifically, the measurement energies in the first map measurement in the step of repeating the map measurement are as follows.

first map measurement: $-3\mathrm{ch}=E_0-3\Delta E$
first map measurement: $-2\mathrm{ch}=E_0-2\Delta E$
first map measurement: $-1\mathrm{ch}=E_0-1\Delta E$
first map measurement: $0\mathrm{ch}=E_0$
first map measurement: $+1\mathrm{ch}=E_0+1\Delta E$
first map measurement: $+2\mathrm{ch}=E_0+2\Delta E$
first map measurement: $+3\mathrm{ch}=E_0+3\Delta E$ The measurement energies in the second map measurement in the step of repeating the map measurement are as follows.

second map measurement: $-3\mathrm{ch}=E_0+4\Delta E$
second map measurement: $-2\mathrm{ch}=E_0+5\Delta E$
second map measurement: $-1\mathrm{ch}=E_0+6\Delta E$
second map measurement: $0\mathrm{ch}=E_0+7\Delta E$
second map measurement: $+1\mathrm{ch}=E_0+8\Delta E$
second map measurement: $+2\mathrm{ch}=E_0+9\Delta E$
second map measurement: $+3\mathrm{ch}=E_0+10\Delta E$ The third or subsequent map measurement is performed in the same manner. In the step of repeating the map measurement, the map measurement is performed m/3 times.

Next, the second step of repeating the map measurement is performed. In the second step of repeating the map measurement, the measurement energy range of the first step of repeating the map measurement is shifted by $\Delta E/a$, i.e., $\Delta E/3$, and the second step thereof is performed. For example, in an example illustrated in the drawing, in the second step of repeating the map measurement, the measurement energy when the measurement is started, i.e., the minimum measurement energy is greater than the measurement energy when the measurement is started in the first step of repeating the map measurement by $\Delta E/3$.

Specifically, the measurement energies in the first map measurement and the measurement energies in the second map measurement in the second step of repeating the map measurement are as follows.

first map measurement: $-3ch=E_0-3\Delta E+\Delta E/3$
first map measurement: $-2ch=E_0-2\Delta E+\Delta E/3$
first map measurement: $-1ch=E_0-1\Delta E+\Delta E/3$
first map measurement: $0ch=E_0+\Delta E/3$
first map measurement: $+1ch=E_0+1\Delta E+\Delta E/3$
first map measurement: $+2ch=E_0+2\Delta E+\Delta E/3$
first map measurement: $+3ch=E_0+3\Delta E+\Delta E/3$
second map measurement: $-3ch=E_0+4\Delta E+\Delta E/3$
second map measurement: $-2ch=E_0+5\Delta E+\Delta E/3$
second map measurement: $-1ch=E_0+6\Delta E+\Delta E/3$
second map measurement: $0ch=E_0+7\Delta E+\Delta E/3$
second map measurement: $+1ch=E_0+8\Delta E+\Delta E/3$
second map measurement: $+2ch=E_0+9\Delta E+\Delta E/3$
second map measurement: $+3ch=E_0+10\Delta E+\Delta E/3$ The third or subsequent map measurement is performed in the same manner.

Next, the third step of repeating the map measurement is performed. In the third step of repeating the map measurement, the measurement energy range in the second step of repeating the map measurement is shifted by $\Delta E/3$, and the third step thereof is performed.

Specifically, the measurement energies in the first map measurement and the measurement energies in the second map measurement in the third step of repeating the map measurement are as follows.

first map measurement: $-3ch=E_0-3\Delta E+2\Delta E/3$
first map measurement: $-2ch=E_0-2\Delta E+2\Delta E/3$
first map measurement: $-1ch=E_0-1\Delta E+2\Delta E/3$
first map measurement: $0ch=E_0+2\Delta E/3$
first map measurement: $+1ch=E_0+1\Delta E+2\Delta E/3$
first map measurement: $+2ch=E_0+2\Delta E+2\Delta E/3$
first map measurement: $+3ch=E_0+3\Delta E+2\Delta E/3$
second map measurement: $-3ch=E_0+4\Delta E+2\Delta E/3$
second map measurement: $-2ch=E_0+5\Delta E+2\Delta E/3$
second map measurement: $-1ch=E_0+6\Delta E+2\Delta E/3$
second map measurement: $0ch=E_0+7\Delta E+2\Delta E/3$
second map measurement: $+1ch=E_0+8\Delta E+2\Delta E/3$
second map measurement: $+2ch=E_0+9\Delta E+2\Delta E/3$
second map measurement: $+3ch=E_0+10\Delta E+2\Delta E/3$ The third or subsequent map measurement is performed in the same manner.

By performing the step of repeating the map measurement three times, it is possible to obtain n×m pieces of map data.

As described above, by performing the step of repeating the map measurement m/a times while shifting the measurement energy range by n×$\Delta E$ a times while shifting the measurement energy range by $\Delta E/a$, it is possible to obtain the spectral map having an energy interval which is less than the measurement energy interval $\Delta E$ between adjacent channeltrons 42. That is, it is possible to obtain the spectral map in which the measurement energy interval is $\Delta E/a$.

3.2.2. Correction of Sensitivity of Electron Spectrometer

While the correction coefficient is determined by extracting a multiple of n pieces of data of consecutive measurement energies from the spectrum S2 in the first embodiment, the correction coefficient is determined by extracting n×a pieces of data of consecutive measurement energies from the spectrum S2 in the third embodiment. With this, the numbers of pieces of data of the individual channeltrons 42 included in the extracted data are equal to each other, and hence it is possible to correct a difference in detection sensitivity between n channeltrons 42.

3.3. Effect

In the analysis method according to the third embodiment, it is also possible to obtain the spectral map in a short period of time similarly to the analysis method according to the first embodiment.

3.4. Modification

Next, a description will be given of modifications of the analysis method according to the third embodiment. In the following description, a description will be given of points different from those of the analysis method according to the first embodiment described above, and the description of points similar to those thereof will be omitted.

3.4.1. First Modification

In the embodiment described above, in the step of obtaining n×m pieces of map data, n×m pieces of map data are obtained by performing, a times, the step of repeating the map measurement m/a times while shifting the measurement energy range by n×$\Delta E$ while shifting the measurement energy range by $\Delta E/a$.

In contrast to this, in a first modification, in the case where $\Delta E$ denotes the measurement energy interval between adjacent channeltrons 42, and the step of repeating the map measurement a times while shifting the measurement energy range by $\Delta E/a$ is performed m/a times while the measurement energy range is shifted by n×$\Delta E$.

Figure 31:
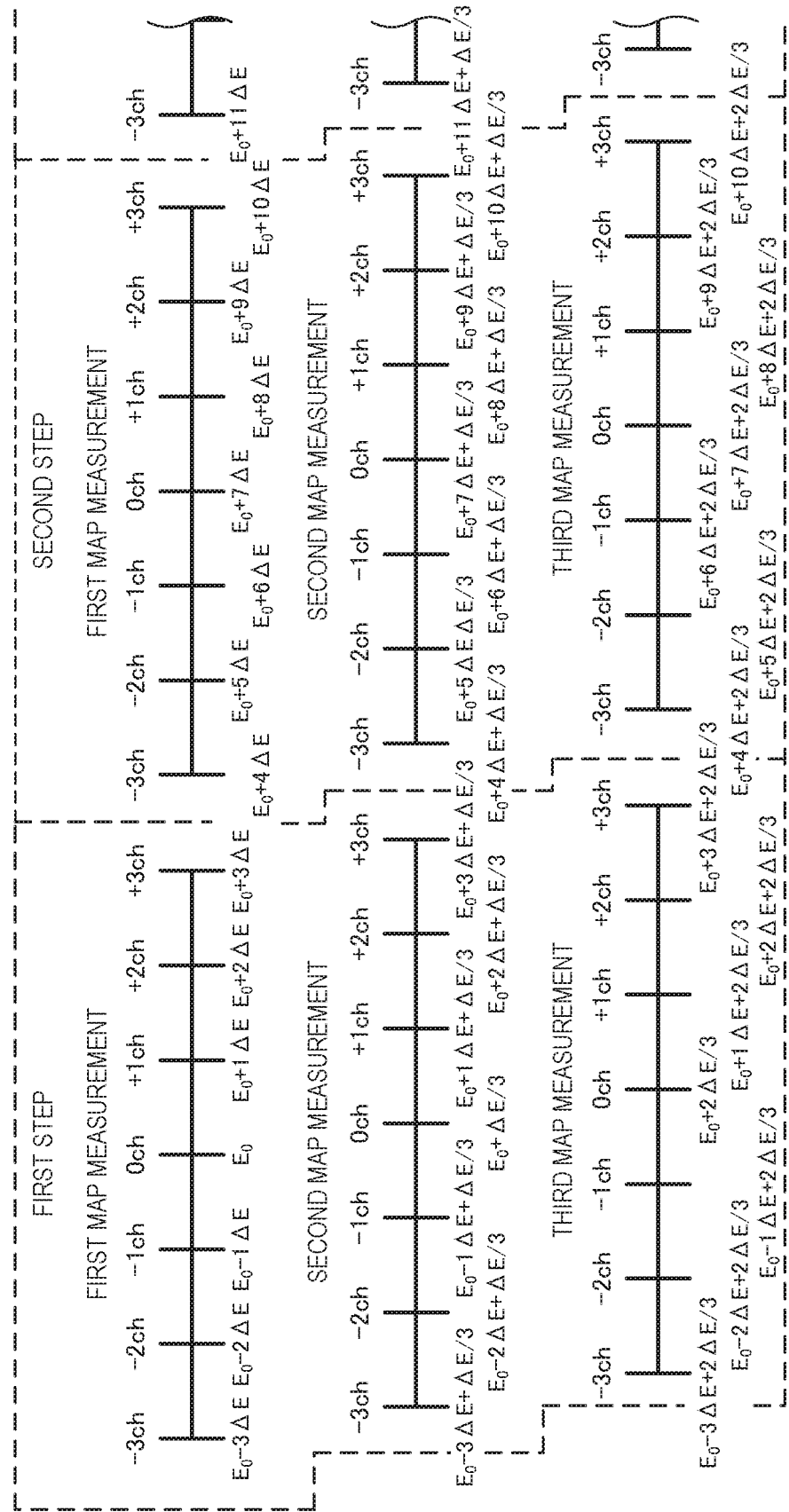
FIG. 31 is a diagram for explaining a method for obtaining map data according to the third modification.

FIG. 31 is a diagram for explaining a method for obtaining map data according to the third modification. FIG. 31 illustrates the case where a=3 is satisfied.

As illustrated in FIG. 31, first, the map measurement is repeated three times while the measurement energy range is shifted by $\Delta E/3$. The measurement energies in the first to third map measurements in the first step of repeating the map measurement three times (hereinafter also referred to as "the step of repeating the map measurement") while shifting the measurement energy range by $\Delta E/3$ are as follows.

first map measurement: $-3ch=E_0-3\Delta E$
first map measurement: $-2ch=E_0-2\Delta E$
first map measurement: $-1\ ch=E_0-1\Delta E$
first map measurement: $0ch=E_0$
first map measurement: $+1ch=E_0+1\Delta E$
first map measurement: $+2ch=E_0+2\Delta E$
first map measurement: $+3ch=E_0+3\Delta E$
second map measurement: $-3ch=E_0-3\Delta E+\Delta E/3$
second map measurement: $-2ch=E_0-2\Delta E+\Delta E/3$
second map measurement: $-1\ ch=E_0-1\Delta E+\Delta E/3$
second map measurement: $0ch=E_0+\Delta E/3$
second map measurement: $+1ch=E_0+1\Delta E+\Delta E/3$
second map measurement: $+2ch=E_0+2\Delta E+\Delta E/3$
second map measurement: $+3ch=E_0+3\Delta E+\Delta E/3$
third map measurement: $-3ch=E_0-3\Delta E+2\Delta E/3$
third map measurement: $-2ch=E_0-2\Delta E+2\Delta E/3$
third map measurement: $-1ch=E_0-1\Delta E+2\Delta E/3$
third map measurement: $0ch=E_0+2\Delta E/3$
third map measurement: $+1ch=E_0+1\Delta E+2\Delta E/3$
third map measurement: $+2ch=E_0+2\Delta E+2\Delta E/3$
third map measurement: $+3ch=E_0+3\Delta E+2\Delta E/3$ Next, the second step of repeating the map measurement is performed. In the second step of repeating the map measurement, the measurement energy range in the first step of repeating the map measurement is shifted by 7×$\Delta E$ (n×$\Delta E$, n=7), and the second step thereof is performed.

Specifically, the measurement energies in the first to third map measurements in the second step of repeating the map measurement are as follows.

first map measurement: $-3ch=E_0+4\Delta E$
first map measurement: $-2ch=E_0+5\Delta E$
first map measurement: $-1ch=E_0+6\Delta E$ first map measurement: 0ch=$E_0+7\Delta E$
first map measurement: +1ch=$E_0+8\Delta E$
first map measurement: +2ch=$E_0+9\Delta E$
first map measurement: +3ch=$E_0+10\Delta E$
second map measurement: −3ch=$E_0+4\Delta E+\Delta E/3$
second map measurement: −2ch=$E_0+5\Delta E+\Delta E/3$
second map measurement: −1ch=$E_0+6\Delta E+\Delta E/3$
second map measurement: 0ch=$E_0+7\Delta E+\Delta E/3$
second map measurement: +1ch=$E_0+8\Delta E+\Delta E/3$
second map measurement: +2ch=$E_0+9\Delta E+\Delta E/3$
second map measurement: +3ch=$E_0+10\Delta E+\Delta E/3$
third map measurement: −3ch=$E_0+4\Delta E+2\Delta E/3$
third map measurement: −2ch=$E_0+5\Delta E+2\Delta E/3$
third map measurement: −1ch=$E_0+6\Delta E+2\Delta E/3$
third map measurement: 0ch=$E_0+7\Delta E+2\Delta E/3$
third map measurement: +1ch=$E_0+8\Delta E+2\Delta E/3$
third map measurement: +2ch=$E_0+9\Delta E+2\Delta E/3$
third map measurement: +3ch=$E_0+10\Delta E+2\Delta E/3$ The third or subsequent step of repeating the map measurement is performed in the same manner. The step of repeating the map measurement is performed m/3 times.

It is possible to obtain n×m pieces of map data by performing, m/3 times, the step of repeating the map measurement three times while shifting the measurement energy range by $\Delta E/3$ while shifting the measurement energy range by n×$\Delta E$.

Also in the first modification, similarly to the third embodiment described above, it is possible to obtain the spectral map having an energy interval which is less than the measurement energy interval $\Delta E$ between adjacent channeltrons 42.

3.4.2. Second Modification

It is possible to apply each of the first to third modifications of the first embodiment described above to the analysis method according to the third embodiment.

4. Fourth Embodiment 4.1. Auger Electron Microscope

The configuration of the Auger electron microscope used in an analysis method according to a fourth embodiment is the same as that of the Auger electron microscope 100 illustrated in FIG. 1 described above, and hence the description thereof will be omitted. The processing section 60 performs processing of correcting the drift of the analysis field described below.

4.2. Analysis Method

In the analysis method according to the fourth embodiment, similarly to the analysis method according to the second embodiment described above, the drift correction is performed during the map measurement and after the map measurement. In the following description, a description will be given of points different from those of the analysis method according to the second embodiment, and the description of points similar to those thereof will be omitted.

(1) Drift Correction During Map Measurement

Figure 32:
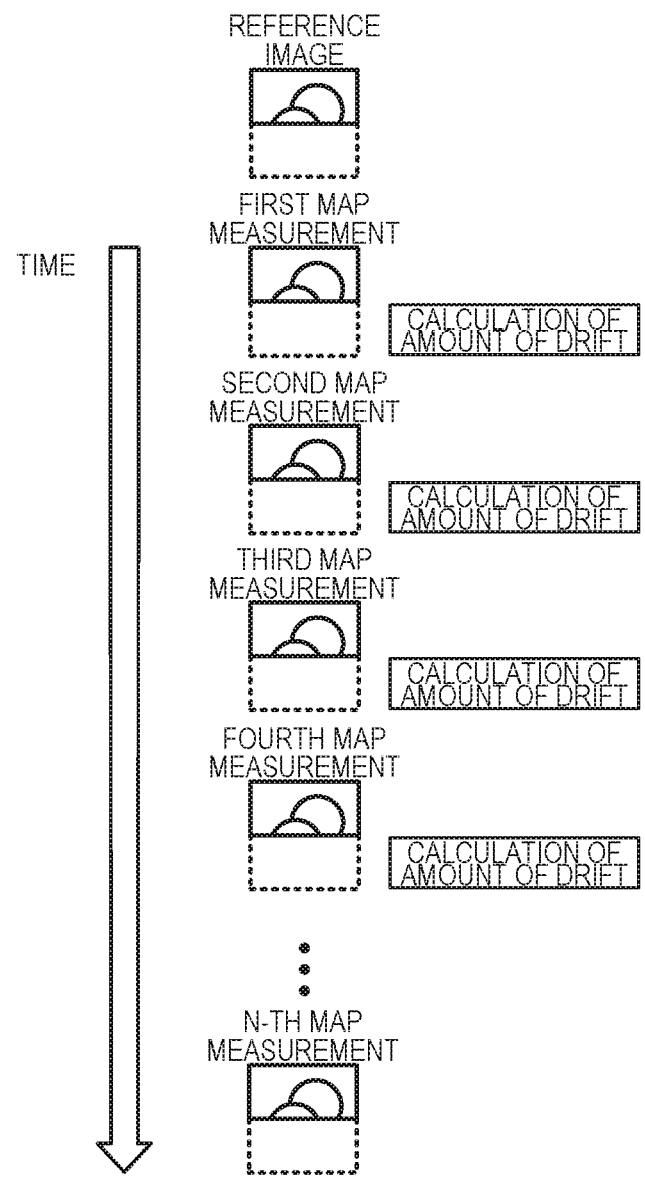
FIG. 32 is a diagram for explaining a drift correction method in the fourth embodiment.

FIG. 32 is a diagram for explaining a drift correction method in the fourth embodiment. In the fourth embodiment, in the step of obtaining n×m pieces of map data, the secondary electron image is obtained together with the map data, and the displacement of the irradiation portion of the electron beam is corrected based on the secondary electron image (probe tracking).

Herein, as described above, the calculation of the amount of drift is performed by comparing the obtained secondary electron image with the secondary electron image serving as the reference (reference image). It takes time to calculate the amount of drift. To cope with this, as illustrated in FIG. 32, the scanning area of the electron beam for obtaining the secondary electron image is made smaller than the scanning area of the electron beam for obtaining the map data. That is, the analysis field of the secondary electron image used in the calculation of the amount of drift is smaller than the analysis field of the map data.

In an example illustrated in FIG. 32, the scanning area of the secondary electron image is half the size of the scanning area of the map data. That is, the analysis field of the secondary electron image is half the size of the analysis field of the map data. Accordingly, it is possible to obtain the secondary electron image in the first half of the scanning of the electron beam for acquiring the map data, and it is possible to compare the obtained secondary electron image with the reference image to calculate the amount of drift in the second half of the scanning of the electron beam. With this, it is possible to reduce a waiting time period for the calculation of the amount of drift between the map measurements.

While the scanning area of the secondary electron image used in the calculation of the amount of drift is half the size of the scanning area of the map data in the example illustrated in FIG. 32, the scanning area of the secondary electron image can be appropriately changed. For example, by setting the scanning area of the secondary electron image to an area which does not cause the waiting time period for the calculation of the amount of drift between the map measurements, it is possible to perform the measurement efficiently.

(2) Drift Correction after Map Measurement

In the step of correcting the drift after the map measurement, the drift is corrected by comparing the secondary electron image which is obtained concurrently with the electron-spectroscopic image with the image serving as the reference. Note that, in the step of correcting the drift after the map measurement, the above-described secondary electron image illustrated in FIG. 32 which has the scanning area which is half the size of that of the map data may be used, or the secondary electron image having the same scanning area as that of the map data may also be used.

Note that, in the above description, while the description has been given of the case where the calculation of the amount of drift is performed with the secondary electron image obtained concurrently with the electron-spectroscopic image, the image is not limited to the secondary electron image as long as the image is a scanning image (an image obtained by scanning of a probe) which can be obtained concurrently with the electron-spectroscopic image. For example, a backscattered electron image may be obtained concurrently with the electron-spectroscopic image, and the calculation of the amount of drift may be performed with the backscattered electron image.

4.3. Effect

In the analysis method according to the fourth embodiment, the secondary electron image is obtained together with the map data in the map measurement, and the displacement of the irradiation position of the electron beam is corrected based on the secondary electron image. Thus, by correcting the displacement of the irradiation position of the electron beam based on the secondary electron image, it is possible to calculate the amount of drift with high accuracy.

In addition, in the analysis method according to the fourth embodiment, the scanning area of the electron beam for obtaining the secondary electron image is smaller than the scanning area of the electron beam for obtaining the map data. Consequently, as illustrated in FIG. 32, it is possible to perform the calculation of the amount of drift while the scanning of the electron beam for obtaining the map data is performed. With this, it is possible to reduce the waiting time period for the calculation of the amount of drift between the map measurements. Consequently, it is possible to perform the measurement efficiently.

5. Fifth Embodiment

5.1. Auger Electron Microscope

The configuration of the Auger electron microscope used in an analysis method according to a fifth embodiment is the same as that of the Auger electron microscope 100 illustrated in FIG. 1 described above, and hence the description thereof will be omitted. The processing section 60 performs processing of correcting the draft of the analysis field described below.

5.2. Analysis Method

In the analysis method according to the fifth embodiment, similarly to the analysis method according to the second embodiment described above, the drift correction is performed during the map measurement and after the map measurement. In the following description, a description will be given of points different from those of the analysis method according to the second embodiment, and the description of points similar to those thereof will be omitted.

(1) Drift Correction During Map Measurement

Figure 33:
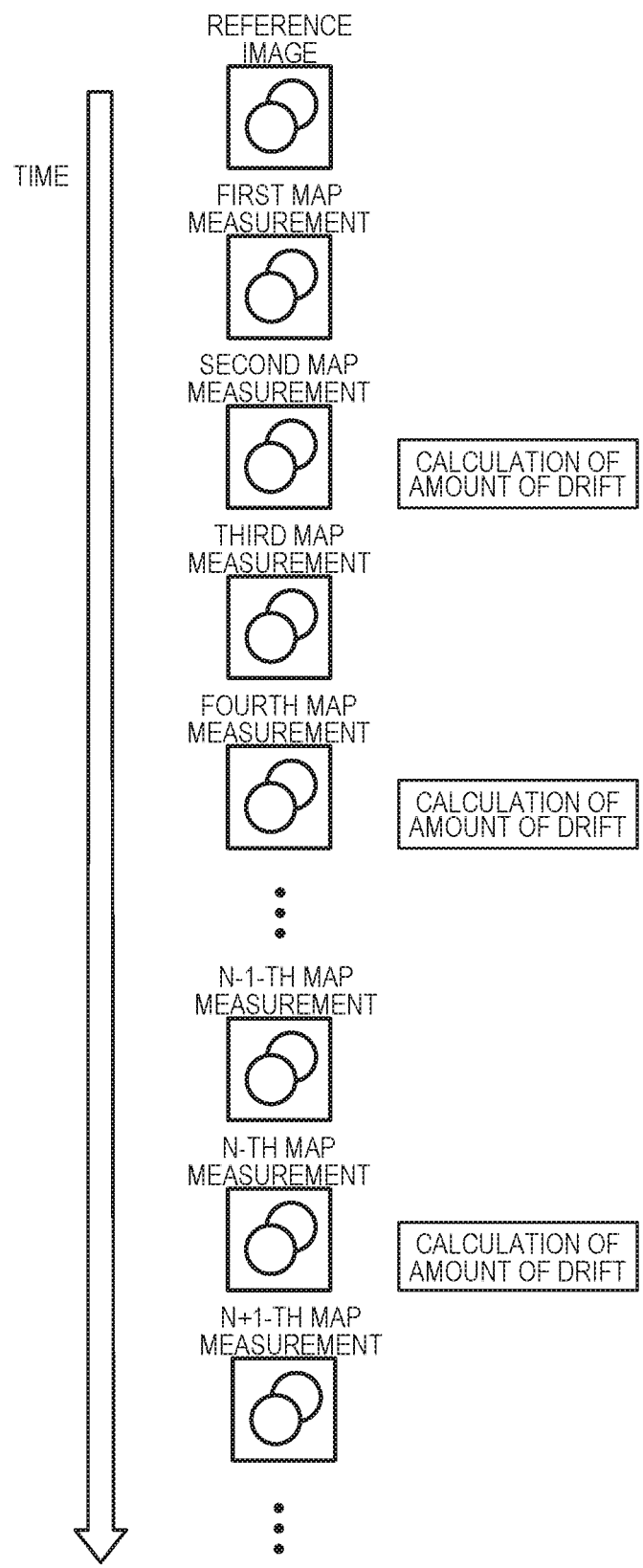
FIG. 33 is a diagram for explaining a drift correction method in the fifth embodiment.

FIG. 33 is a diagram for explaining a drift correction method in the fifth embodiment. In the fourth embodiment illustrated in FIG. 32 described above, the waiting time period for the calculation of the amount of drift is reduced by making the scanning area of the electron beam for obtaining the secondary electron image smaller than the scanning area of the electron beam for obtaining the map data.

In contrast to this, in the fifth embodiment, as illustrated in FIG. 33, the secondary electron image is obtained together with the map data by performing the first map measurement, and the calculation of the amount of drift is performed by comparing the secondary electron image obtained in the first map measurement with the reference image while the second map measurement is performed. Subsequently, based on the calculation result of the amount of drift, the displacement of the irradiation position of the electron beam is corrected in the third map measurement.

Similarly, the secondary electron image is obtained together with the map data by performing the third map measurement, and the calculation of the amount of drift is performed by comparing the secondary electron image obtained in the third map measurement with the reference image while the fourth map measurement is performed. Subsequently, based on the calculation result of the amount of drift, the displacement of the irradiation position of the electron beam is corrected in the fifth map measurement.

Thus, in the fifth embodiment, the secondary electron image is obtained together with the map data by performing the (N−1)th map measurement, and the calculation of the amount of drift is performed by comparing the secondary electron image obtained in the (N−1)th map measurement with the reference image while the N-th map measurement is performed. Subsequently, based on the calculation result of the amount of drift, the displacement of the irradiation position of the electron beam is corrected in the (N+1)th map measurement.

(2) Drift Correction after Map Measurement

The drift correction after the map measurement is the same as that in the second embodiment described above, and hence the description thereof will be omitted.

5.3. Effect

In the analysis method according to the fifth embodiment, the secondary electron image is obtained together with the map data by performing the (N−1)th map measurement, and the calculation of the amount of drift is performed by comparing the secondary electron image obtained in the (N−1)th map measurement with the reference image while the N-th map measurement is performed. In addition, based on the calculation result of the amount of drift, the correction of the irradiation position of the electron beam is performed in the (N+1)th map measurement. Consequently, it is possible to reduce the waiting time period for the calculation of the amount of drift and perform the measurement efficiently.

Note that a time period for calculating the amount of drift may be changed according to a time period required for the calculation of the amount of drift. For example, the secondary electron image is obtained together with the map data by performing the (N−1)th map measurement, and the calculation of the amount of drift is performed by comparing the secondary electron image obtained in the (N−1)th map measurement with the reference image while the N-th map measurement and the (N+1)th map measurement are performed. Subsequently, based on the calculation result of the amount of drift, the displacement of the irradiation position of the electron beam is corrected in the (N+2)th map measurement. With this, it is possible to perform the calculation of the amount of drift while the map measurement is performed twice.

Note that, according to the time period for calculating the amount of drift, the calculation of the amount of drift may be performed while the map measurement is performed three times or while the map measurement is performed four times.

6. Sixth Embodiment

6.1. Auger Electron Microscope

The configuration of the Auger electron microscope used in an analysis method according to a sixth embodiment is the same as that of the Auger electron microscope 100 illustrated in FIG. 1 described above, and hence the description thereof will be omitted. The processing section 60 performs processing of correcting the drift of the analysis field described below.

6.2. Analysis Method (1) Drift Correction During Map Measurement

While the probe tracking is performed based on one secondary electron image obtained in one map measurement in each of the fourth embodiment and the fifth embodiment described above, the probe tracking may also be performed based on N secondary electron images obtained by repeating the map measurement N times.

For example, a function representing a temporal change of the amount of drift is determined based on the secondary electron image obtained in the first map measurement, the secondary electron image obtained in the second map measurement, and the secondary electron image obtained in the third map measurement. Subsequently, the amount of drift in the fourth map measurement is calculated by using the function, and the displacement of the irradiation position of the electron beam is corrected in the fourth map measurement.

(2) Drift Correction after Map Measurement

The drift correction after the map measurement is the same as that in the second embodiment described above, and hence the description thereof will be omitted.

6.3. Effect

In the analysis method according to the sixth embodiment, based on N secondary electron images obtained by repeating the map measurement N times, the temporal change of the displacement of the irradiation position of the electron beam is determined, and the displacement of the irradiation position of the electron beam is corrected. Consequently, in the analysis method according to the sixth embodiment, it is possible to correct the displacement of the irradiation position of the electron beam accurately. For example, even in the case where the drift of the analysis field is represented by a non-linear function, it is possible to correct the drift of the analysis field accurately in the sixth embodiment.

7. Seventh Embodiment 7.1. Auger Electron Microscope

The configuration of the Auger electron microscope used in an analysis method according to a seventh embodiment is the same as that of the Auger electron microscope 100 illustrated in FIG. 1 described above, and hence the description thereof will be omitted. The processing section 60 performs processing of correcting the drift of the analysis field described below.

7.2. Analysis Method (1) Drift Correction During Map Measurement

Figure 34:
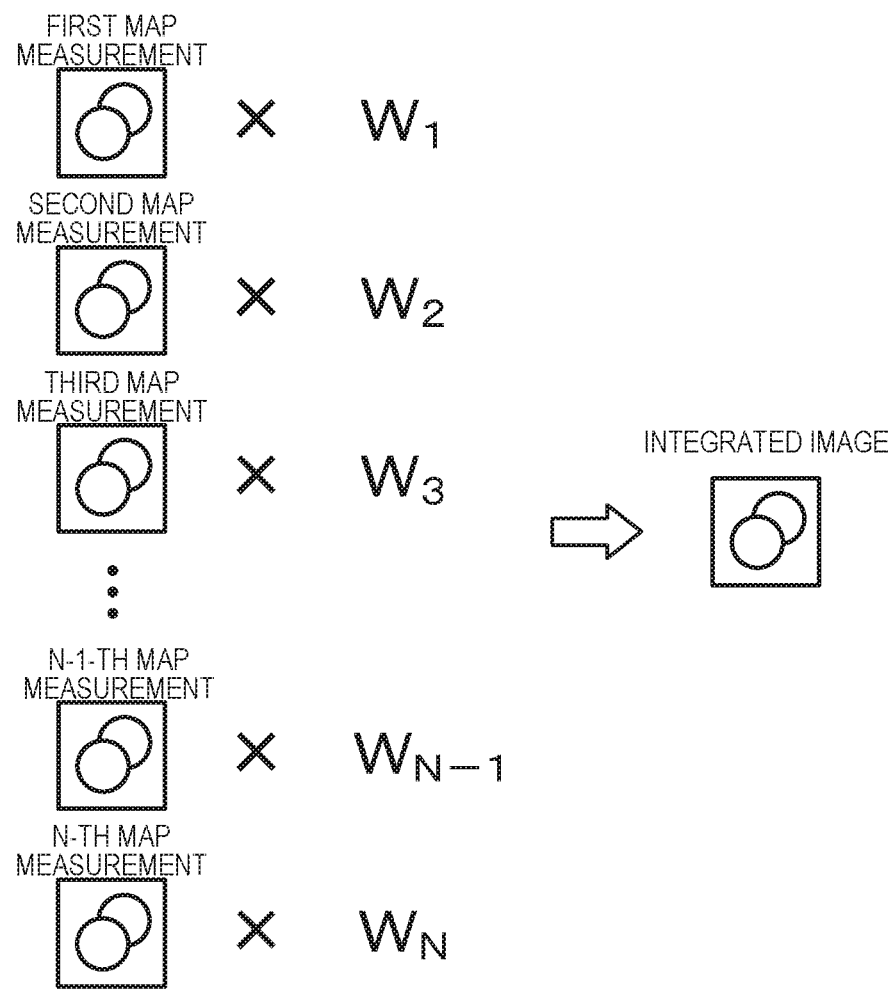
FIG. 34 is a diagram for explaining a drift correction method in the seventh embodiment.

FIG. 34 is a diagram for explaining a drift correction method in the seventh embodiment.

While the probe tracking is performed based on one secondary electron image obtained in one map measurement in each of the fourth embodiment and the fifth embodiment described above, as illustrated in FIG. 34, an integrated image may be generated by adding up N secondary electron images obtained by repeating the map measurement N times, and the probe tracking may be performed based on the generated integrated image.

In addition, when N secondary electron images are added up, each secondary electron image may be weighted. For example, the weight of the secondary electron image obtained in the N-th map measurement is made greater than the weight of the secondary electron image obtained in the (N−1)th map measurement.

In an example illustrated in FIG. 34, $W_1$ denotes the weight of the secondary electron image obtained in the first map measurement, $W_2$ denotes the weight of the secondary electron image obtained in the second map measurement, $W_3$ denotes the weight of the secondary electron image obtained in the third map measurement, $W_{N-1}$ denotes the weight of the secondary electron image obtained in the (N−1)th map measurement, and $W_N$ denotes the weight of the secondary electron image obtained in the N-th map measurement. At this point, $W_1 < W_2 < W_3 < \ldots < W_{N-1} < W_N$ is satisfied. Note that $W_1 + W_2 + W_3 + \ldots + W_{N-1} + W_N = 1$ is satisfied.

When N secondary electron images are added up, the above weight is assigned to each secondary electron image and the addition is performed. With this, it is possible to obtain the integrated image.

Based on the integrated image obtained in this manner, the displacement of the irradiation position of the electron beam is corrected. For example, the amount of drift is calculated by comparing the integrated image with a reference image, and the displacement of the irradiation position of the electron beam is corrected based on the calculated amount of drift.

(2) Drift Correction after Map Measurement

While the calculation of the amount of drift is performed with the electron-spectroscopic image or the secondary electron image obtained in one map measurement in the second embodiment described above, an integrated image may be generated by adding up N electron-spectroscopic images or N secondary electron images obtained by repeating the map measurement N times, and the calculation of the amount of drift may be performed based on the generated integrated image. The method for generating the integrated image is the same as that of the drift correction during the map measurement described above.

7.3. Effect

In the analysis method according to the seventh embodiment, the integrated image is generated by adding up N secondary electron images obtained by repeating the map measurement N times, and the displacement of the irradiation position of the electron beam is corrected based on the integrated image. Herein, the integrated image is reduced in noise and is sharp compared with the secondary electron image obtained in one measurement. Consequently, in the analysis method according to the seventh embodiment, it is possible to calculate the amount of drift more precisely, and it is possible to correct the displacement of the irradiation position of the electron beam more accurately.

In addition, in the analysis method according to the seventh embodiment, when N secondary electron images are added up, each secondary electron image is weighted. At this point, the weight of the secondary electron image obtained in the N-th map measurement is greater than the weight of the secondary electron image obtained in the (N−1)th map measurement. Consequently, in the analysis method according to the seventh embodiment, it is possible to calculate the amount of drift more precisely, and it is possible to correct the displacement of the irradiation position of the electron beam more accurately.

8. Others

Note that the invention is not limited to the embodiments described above, and can be variously modified and implemented within the scope of the invention.

While the Auger electron microscope is described as the analysis apparatus used in the analysis method according to the embodiment of the invention in each of the first to seventh embodiments, the primary probe with which the specimen is irradiated is not limited to electrons, and the primary probe may be any probe as long as the probe causes the specimen to emit electrons. For example, the primary probe may be X-rays. In this case, the analysis apparatus used in the analysis method according to the embodiment of the invention is an X-ray photoelectron spectroscope.

In addition, while the energy intensity of the primary probe is assumed to be constant in each of the first to seventh embodiments described above, the invention can also be applied to the case where the energy intensity of the primary probe is changed. In this case, by performing arithmetic calculation which divides the intensity of the signal at each measurement point by the energy intensity of the primary probe as preprocessing, it is possible to perform the same processing as that of each of the first to seventh embodiments.

The above-described embodiments and modifications are examples and the invention is not limited thereto. For example, the embodiments and the modifications may be combined appropriately.

The invention is not limited to the above-described embodiments, and various modifications can be made. For example, the invention includes configurations that are substantially the same as the configurations described in the embodiments. Substantially same configurations means configurations that are the same in function, method, and results, or configurations that are the same in objective and effects, for example. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. An analysis method which uses an analysis apparatus, the analysis apparatus comprising an electron spectrometer which comprises: an analyzer which analyzes energy of electrons emitted from a specimen by irradiating the specimen with a primary probe; and a detector which comprises a number of detection sections, denoted by n, arranged in an energy dispersion direction of the electrons of which the energy has been analyzed by the analyzer, the analysis method comprising:
   obtaining a number of pieces of map data, denoted by n×m, by repeating a map measurement a number of times, denoted by m, in which a number of pieces of map data equal to the number of detection sections, denoted by n, are obtained by scanning the specimen with the primary probe to detect the electrons emitted from the specimen with the electron spectrometer, while measurement energy ranges of the analyzer are varied;
   generating a spectral map in which a position on the specimen is associated with a spectrum based on the number of pieces of map data, denoted by n×m, the measurement energy ranges of the map measurement repeated the number of times, denoted by m, not overlapping each other, and
   determining a correction coefficient for correcting a detection sensitivity of the electron spectrometer by determining a first correction coefficient for correcting intensity of a first measurement energy detected by a first detection section based on intensity data of the first measurement energy and intensity data of measurement energy of the spectrum consecutive to the first measurement energy, and determining a second correction coefficient for correcting intensity of the second measurement energy detected by the first detection section based on intensity data of the second measurement energy and intensity data of measurement energy of the spectrum consecutive to the second measurement energy, the second correction coefficient being different from the first correction coefficient, wherein the correction coefficient is determined every time when each of the measurement energies detected by the detection sections has been changed,
   wherein spectrum obtained from the spectral map includes the intensity data of the first measurement energy detected by the first detection section among the number of detection sections, denoted by n, and the intensity data of a second measurement energy which is detected by the first detection section and different from the first measurement energy.

2. The analysis method according to claim 1, wherein
a measurement energy range of a j-th map measurement and a measurement energy range of a (j+1)th map measurement do not overlap each other, wherein j is a value greater than or equal to 1 and less than or equal to m,
the map measurements are performed in a mode in which an energy resolution is constant,
the number of detection sections, denoted by n, are set to have measurement energy intervals which are equal to each other, and
a difference between a maximum value of measurement energies of the number of detection sections, denoted by n, in the j-th map measurement and a minimum value of measurement energies of the number of detection sections, denoted by n, in the (j+1)th map measurement is equal to the measurement energy intervals of the number of detection sections, denoted by n.

3. The analysis method according to claim 1, wherein
a measurement energy range of a j-th map measurement and a measurement energy range of a (j+1)th map measurement do not overlap each other, wherein j is a value greater than or equal to 1 and less than or equal to the number of times the map measurement is repeated, denoted by m,
the electron spectrometer includes an input lens which decelerates the electrons entering the analyzer,
the map measurement is performed in a mode in which an energy resolution changes in association with a measurement energy, and
in a case where $E_{j-1}$ denotes a median of measurement energies of the number of detection sections, denoted by n, in the j-th map measurement and $\alpha$ denotes a value proportional to a deceleration rate of the input lens, a median $E_j$ of measurement energies of the n detection sections in the (j+1)th map measurement satisfies $$E_j = E_{j-1}(1+\alpha).$$

4. The analysis method according to claim 1, wherein
in determining the correction coefficient, the correction coefficient is determined for each of the detection sections.

5. The analysis method according to claim 1, wherein
in determining the correction coefficient, the correction coefficient is determined based on the spectrum obtained from the generated spectral map.

6. The analysis method according to claim 1, wherein
in determining the correction coefficient, the correction coefficient is determined by extracting, from the obtained spectrum, a multiple of a number of pieces of data of consecutive measurement energies.

7. The analysis method according to claim 1, wherein
in determining the correction coefficient, the generated spectral map is partitioned into a plurality of areas, the spectrum is obtained for each of the areas, and the correction coefficient is determined for each of the areas.

8. The analysis method according to claim 1, further comprising
correcting drift of an analysis field, wherein
in correcting the drift of the analysis field,
an electron-spectroscopic image is generated based on the map data, and
the drift of the analysis field is corrected by comparing the generated electron-spectroscopic image with an image serving as a reference.

9. The analysis method according to claim 1, further comprising
correcting drift of an analysis field, wherein
correcting the drift of the analysis field is performed after obtaining the number of pieces of map data, denoted by n×m, and
in correcting the drift of the analysis field,
a number of electron-spectroscopic images are generated based on the number of pieces of map data, denoted by n×m, and
the drift of the analysis field is corrected by comparing each of the number of electron-spectroscopic images with an image serving as a reference.

10. The analysis method according to claim 1, wherein
the analysis apparatus includes an electron detector for detecting the electrons emitted from the specimen by irradiating the specimen with the primary probe to obtain a scanning image,
in obtaining the number of pieces of map data, denoted by n×m,
the scanning image is obtained together with the map data in the map measurement, and
displacement of an irradiation position of the primary probe is corrected based on the scanning image.

11. The analysis method according to claim 10, wherein a scanning area of the primary probe for obtaining the scanning image is smaller than a scanning area of the primary probe for obtaining the map data.

12. The analysis method according to claim 10, wherein
a temporal change of the displacement of the irradiation position is determined based on N scanning images obtained by repeating the map measurement N times, the N scanning images each being the scanning image,
the displacement of the irradiation position is corrected, and
N is a value less than or equal to the number of times the map measurement is repeated, denoted by m.

13. The analysis method according to claim 10, wherein
an integrated image is generated by adding up the N scanning images obtained by repeating the map measurement N times,
the displacement of the irradiation position is corrected based on the integrated image, and
N is a value less than or equal to the number of times the map measurement is repeated, denoted by m.

14. The analysis method according to claim 13, wherein
each of the N scanning images is weighted when the N scanning images are added up, and
a weight of the scanning image obtained in an N-th map measurement is greater than a weight of the scanning image obtained in an (N−1)th map measurement.

15. An analysis method which uses an analysis apparatus, the analysis apparatus comprising an electron spectrometer which comprises: an analyzer which analyses energy of electrons emitted from a specimen by irradiating the specimen with a primary probe; and a detector which comprises a number of detection sections, denoted by n, arranged in an energy dispersion direction of the electrons of which the energy has been analyzed by the analyzer, the analysis method comprising:
obtaining a number of pieces of map data, denoted by n×m, by repeating a map measurement a number of times, denoted by m, in which a number of pieces of map data equal to the number of detection sections, denoted by n, are obtained by scanning the specimen with the primary probe to detect the electrons emitted from the specimen with the electron spectrometer, while measurement energy ranges of the analyzer are varied;
generating a spectral map in which a position on the specimen is associated with a spectrum based on the number of pieces of map data, denoted by n×m, measurement energies of the detection sections not overlapping each other in the map measurement repeated the number of times, denoted by m, and
determining a correction coefficient for correcting a detection sensitivity of the electron spectrometer by determining a first correction coefficient for correcting intensity of a first measurement energy detected by a first detection section based on intensity data of the first measurement energy and intensity data of measurement energy of the spectrum consecutive to the first measurement energy, and determining a second correction coefficient for correcting intensity of the second measurement energy detected by the first detection section based on intensity data of the second measurement energy and intensity data of measurement energy of the spectrum consecutive to the second measurement energy, the second correction coefficient being different from the first correction coefficient, wherein the correction coefficient is determined every time when each of the measurement energies detected by the detection sections has been changed,
wherein spectrum obtained from the spectral map includes the intensity data of the first measurement energy detected by the first detection section among the number of detection sections, denoted by n, and the intensity data of a second measurement energy which is detected by the first detection section and different from the first measurement energy.

16. The analysis method according to claim 15, wherein
in a case where $\Delta E$ denotes a measurement energy interval between adjacent detection sections of the detection sections,
in obtaining the number of pieces of map data, denoted by n×m,
repeating the map measurement m/a times while shifting a measurement energy range by n×$\Delta E$ is performed a number of times, denoted by a, while the measurement energy range is shifted by $\Delta E$/a.

17. The analysis method according to claim 15, wherein
in a case where $\Delta E$ denotes a measurement energy interval between an adjacent detection sections of the detection sections,
in obtaining the number of pieces of map data, denoted by n×m,
repeating the map measurement a times while shifting the measurement energy range by $\Delta E$/a is performed a number of times, denoted by m/a, while the measurement energy range is shifted by n×$\Delta E$.

18. An analysis apparatus comprising:
an electron spectrometer comprising an analyzer which analyzes energy of electrons emitted from a specimen by irradiating the specimen with a primary probe, and a detector which comprises a number of detection sections, denoted by n, arranged in an energy dispersion direction of the electrons of which the energy has been analyzed by the analyzer; and
a processing section which generates a spectral map in which a position on the specimen is associated with a spectrum based on a detection result of the electrons in the electron spectrometer,
the processing section performing:
processing of obtaining a number of pieces of map data, denoted by n×m, by repeating a map measurement a number of times, denoted by m, in which a number pieces of map data equal to the number of detection sections, denoted by n, are obtained by scanning the specimen with the primary probe to detect the electrons emitted from the specimen with the electron spectrometer, while measurement energy ranges of the analyzer are varied;
processing of generating the spectral map in which the position on the specimen is associated with the spectrum based on the number of pieces of map data, denoted by n×m, the measurement energy ranges of the map measurement repeated the number of times, denote by m, not overlapping each other, and
processing of determining a correction coefficient for correcting a detection sensitivity of the electron spectrometer by determining a first correction coefficient for correcting intensity of a first measurement energy detected by a first detection section based on intensity data of the first measurement energy and intensity data of measurement energy of the spectrum consecutive to the first measurement energy, and determining a second correction coefficient for correcting intensity of the second measurement energy detected by the first detection section based on intensity data of the second measurement energy and intensity data of measurement energy of the spectrum consecutive to the second measurement energy, the second correction coefficient being different from the first correction coefficient, wherein the correction coefficient is determined every time when each of the measurement energies detected by the detection sections has been changed,
wherein spectrum obtained from the spectral map includes the intensity data of the first measurement energy detected by the first detection section among the number of detection sections, denoted by n, and the intensity data of a second measurement energy which is detected by the first detection section and different from the first measurement energy.

19. An analysis apparatus comprising:
an electron spectrometer including an analyzer which analyzes energy of electrons emitted from a specimen by irradiating the specimen with a primary probe, and a detector which includes a number of detection sections, denoted by n, arranged in an energy dispersion direction of the electrons of which the energy has been analyzed by the analyzer; and
a processing section which generates a spectral map in which a position on the specimen is associated with a spectrum based on a detection result of the electrons in the electron spectrometer,
the processing section performing:
processing of obtaining a number of pieces of map data, denoted by n×m, by repeating a map measurement a number of times, denoted by m, in which a number of pieces of map data equal to the number of detection sections, denoted by n, are obtained by scanning the specimen with the primary probe to detect the electrons emitted from the specimen with the electron spectrometer, while measurement energy ranges of the analyzer are varied;
processing of generating the spectral map in which the position on the specimen is associated with the spectrum based on the n×m pieces of map data, measurement energies of the detection sections not overlapping each other in the map measurement repeated the number of times, denoted by m; and
processing of determining a correction coefficient for correcting a detection sensitivity of the electron spectrometer by determining a first correction coefficient for correcting intensity of a first measurement energy detected by a first detection section based on intensity data of the first measurement energy and intensity data of measurement energy of the spectrum consecutive to the first measurement energy, and determining a second correction coefficient for correcting intensity of the second measurement energy detected by the first detection section based on intensity data of the second measurement energy and intensity data of measurement energy of the spectrum consecutive to the second measurement energy, the second correction coefficient being different from the first correction coefficient, wherein the correction coefficient is determined every time when each of the measurement energies detected by the detection sections has been changed,
wherein spectrum obtained from the spectral map includes the intensity data of the first measurement energy detected by the first detection section among the number of detection sections, denoted by n, and the intensity data of a second measurement energy which is detected by the first detection section and different from the first measurement energy.

* * * * *